United States Patent [19]

Sakakibara et al.

[11] 3,713,351
[45] Jan. 30, 1973

[54] ELECTRICAL AUTOMATIC SHIFT CONTROL SYSTEM WITH HILLY COUNTRY DETECTING UNIT

[75] Inventors: Shigeru Sakakibara, Aichi-ken; Takaaki Kato, Toyohashi-shi; Katsunori Ito, Kariya-shi, all of Japan

[73] Assignees: Toyota Jidosha Kogyo Kabushiki Kaisha, Toyota-shi; Nippondenso Kabushiki Kaisha, Kariya-shi, Japan

[22] Filed: Sept. 17, 1970

[21] Appl. No.: 73,158

[30] Foreign Application Priority Data

Sept. 27, 1969 Japan....................44/77247
Oct. 20, 1969 Japan....................44/83725
Nov. 14, 1969 Japan....................44/91729
Feb. 12, 1970 Japan....................45/12381

[52] U.S. Cl....................74/645, 74/752 A, 74/866, 74/731
[51] Int. Cl........F16h 47/50, F16h 5/42, B60k 21/00
[58] Field of Search....................74/731, 752 A, 866

[56] References Cited

UNITED STATES PATENTS 3,267,762 8/1966 Reval....................74/866 X
3,448,640 1/1969 Nelson....................74/866
3,572,168 3/1971 Shirai et al....................74/752 A

*Primary Examiner*—Arthur G. McKeon
*Attorney*—Cushman, Darby & Cushman

[57] ABSTRACT

The present invention relates to an electrical automatic shift control system with a hilly country detecting unit which is adapted for use with an automatic transmission for automobiles comprising a fluid type torque converter transmission with a speed change gear, friction engaging means for accomplishing shifting gear engagements of the speed change gear, and a hydraulic actuation circuit for controlling the friction engaging means. The automatic shift control system comprises a climbing road condition logic circuit, a downhill road condition logic circuit and a memory circuit, whereby it functions such that the control unit of the torque converter for effecting normal automatic gear changes in a hilly country is properly restrained from changing to top gear thereby automatically and easily preventing the transmission from changing to top gear on inclines and declines and on curved roads, while this hilly country driving condition is released upon changing into level road running.

12 Claims, 39 Drawing Figures

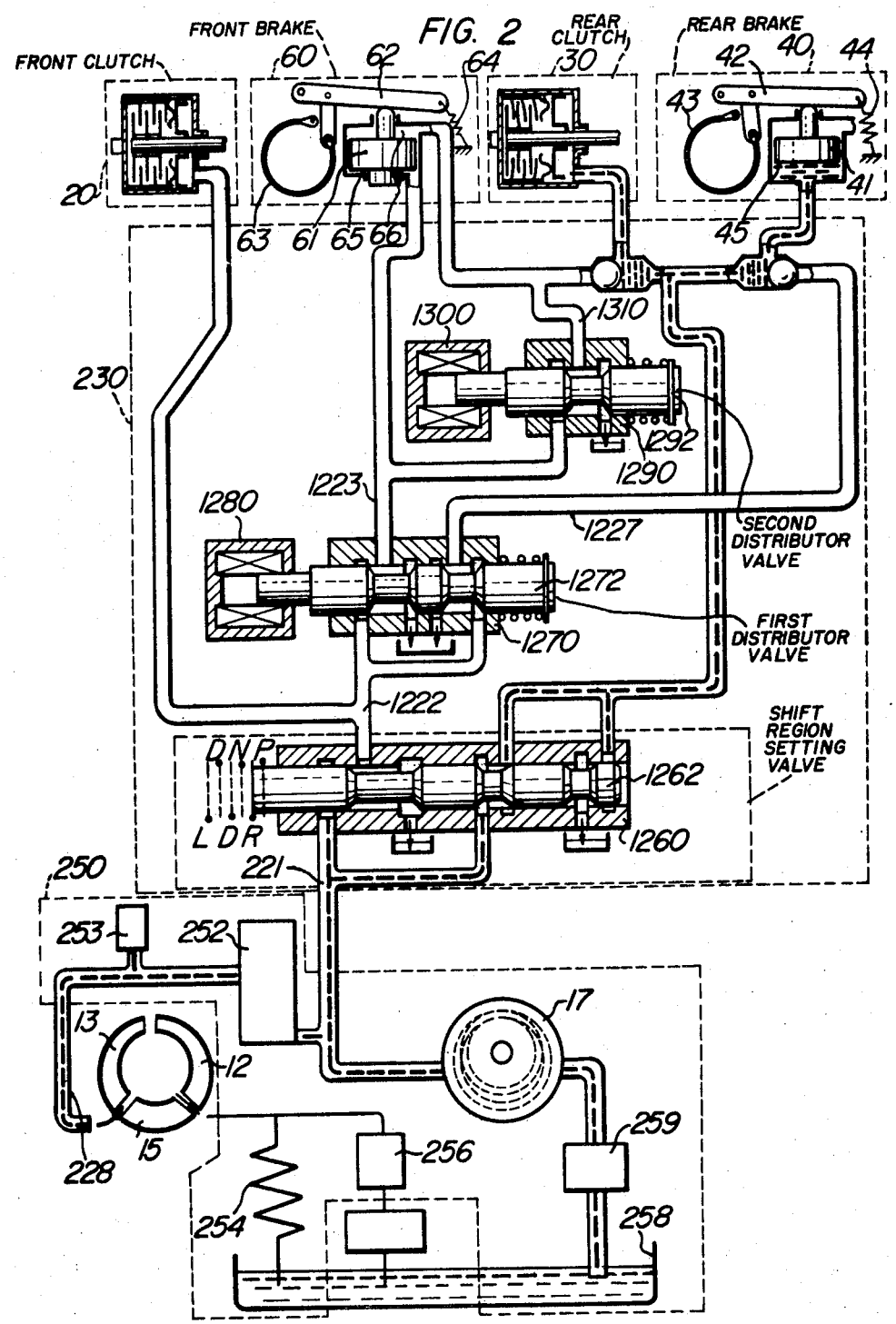

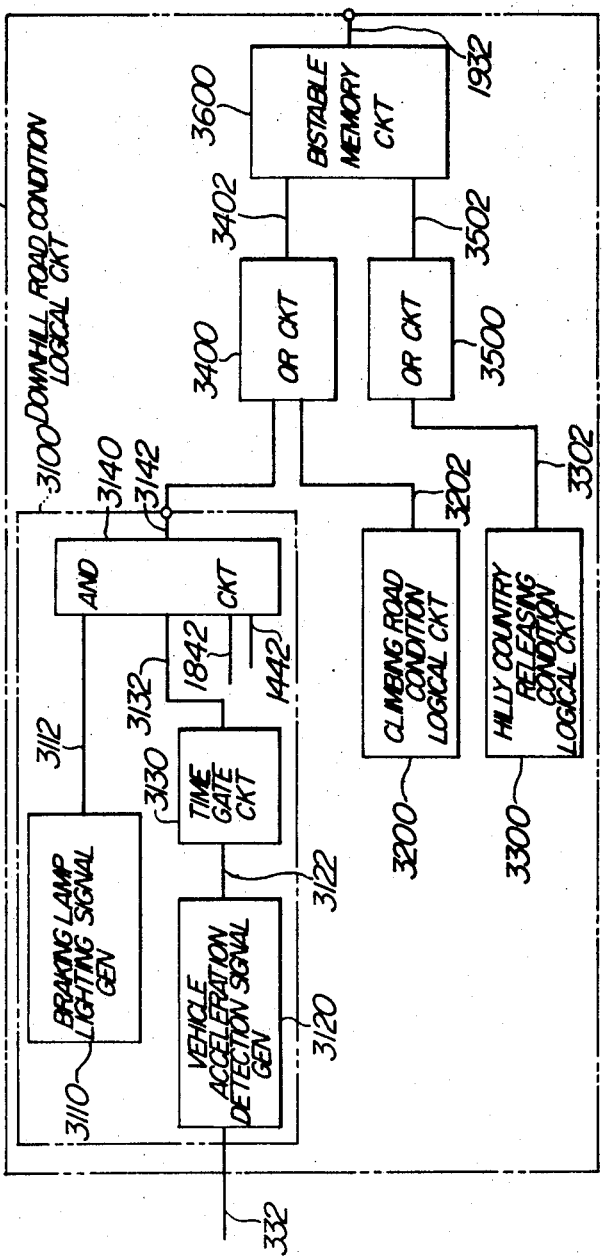
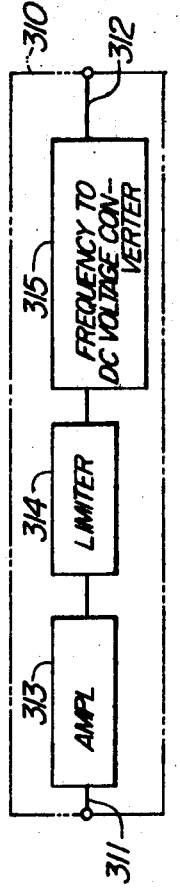
FIG. 5
FIG. 7

3700 LOGICAL CKT RESPONSIVE TO ACCELERATOR-PEDAL DISPLACEMENT

ELECTRICAL AUTOMATIC SHIFT CONTROL SYSTEM WITH HILLY COUNTRY DETECTING UNIT

The present invention relates to improvements in or relating to an electrical automatic shift control system for controlling an automatic transmission for automobiles which comprises a fluid torque converter transmission including a speed change gear, friction engaging means for accomplishing shifting gear engagements of the speed change gear, and a hydraulic actuation circuit for controlling the friction engaging means.

The conventional automatic shift control systems having been generally satisfactory for the running of a car on a level road. On the other hand, in the course of a running in a hilly country the gear engagement position of the transmission frequently changed with changes in the gradient and the resultant variations in the accelerator pedal position, that is, the number of upshifting and downshifting gear changes was increased with the resultant loss of torque on an ascent and the inefficiency of braking force on a descent. In other words, there were inconveniences such as useless gear changes, irrational gear changes, uncomfortable gear changes and occasionally dangerous gear changes. In the past, it has been the practice to deal with these situations by manually causing the transmission to engage the next lower gear, whereas the fact that such shift controls were not automatic has naturally involved inconveniences and lack of ease.

In order to solve these problems, the present invention therefore has for its object the provision of an electrical automatic shift control system with a hilly country detecting unit which is adapted such that as the car enters hilly country, this is automatically detected so as to effect the shift controls that suit the driving conditions in the hilly country. More particularly, the present invention has the object of providing a control system with excellent gearshifting characteristics in which a climbing road condition logic circuit and a downhill road condition logic circuit generate signals which are then stored in a memory circuit, so that in accordance with these signals the control unit of the torque converter for effecting normal automatic gear changes in a hilly country is properly restrained from changing gear to top gear to thereby automatically and easily prevent the transmission from changing to top gear on upward and downward slopes and on the curved roads, while on the other hand the hilly country driving condition is automatically released by means of a hilly country releasing condition logic circuit upon changing into level road running.

According to the present invention, there is an effect in that since the automatic shift control system for controlling the transmission in accordance with the slip ratio of the torque converter is provided with an AND circuit connected between a bistable memory circuit and a solenoid adapted to effect a shift between the top gear position and the second gear position and the signal from a hilly country detecting unit is introduced into the AND circuit, the number of revolutions of the torque converter pump shaft (engine rpm) automatically varies because of the transmission being controlled according to the slip ratio of the torque converter thereby giving an excellent running feeling, and moreover, the gear is changed to the second gear position in a hilly country by virtue of the hilly country detecting unit so that sufficient acceleration on an ascent and the effectiveness of a powerful engine braking on a descent can be accomplished.

According to the present invention, there is another remarkable effect in that since the hilly country detecting unit comprises a climbing road condition logic circuit for generating a signal on an uphill road, a downhill road condition logic circuit for generating a signal on a down grade, and a bistable memory circuit which passes into one of two stable states to keep generating signals upon application thereto of the signal from the climbing road condition logic circuit or the downhill road condition logic circuit and which changes to the other of the two stable states to keep extinguishing the signal upon application thereto of the hilly country releasing condition logic circuit, whereby the transmission is retained in the second gear position or the first gear position on the uphill and downhill roads so as to ensure a sufficient acceleration or the effective engine braking, and at the same time an inconvenience is eliminated in which the transmission frequently changes its gear engagements between the top gear position and the lower gear positions in response to a slight change in the grade of a hill and a small change in the accelerator pedal displacement, thereby ensuring the proper control of gear changing operations by the transmission in hilly country.

Other objects, features and advantages will be readily apparent from the following detailed descriptions of preferred embodiments of the present invention taken in conjunction with the accompanying drawings, in which:

FIG. 2 is a diagram for explaining the hydraulic actuation circuit used with the present invention;

FIG. 5 is a block diagram showing the construction of a hilly country detecting unit used with the control system of FIG. 4;

FIG. 7 is a block diagram showing the construction of a revolution operating circuit;

Figure 37:
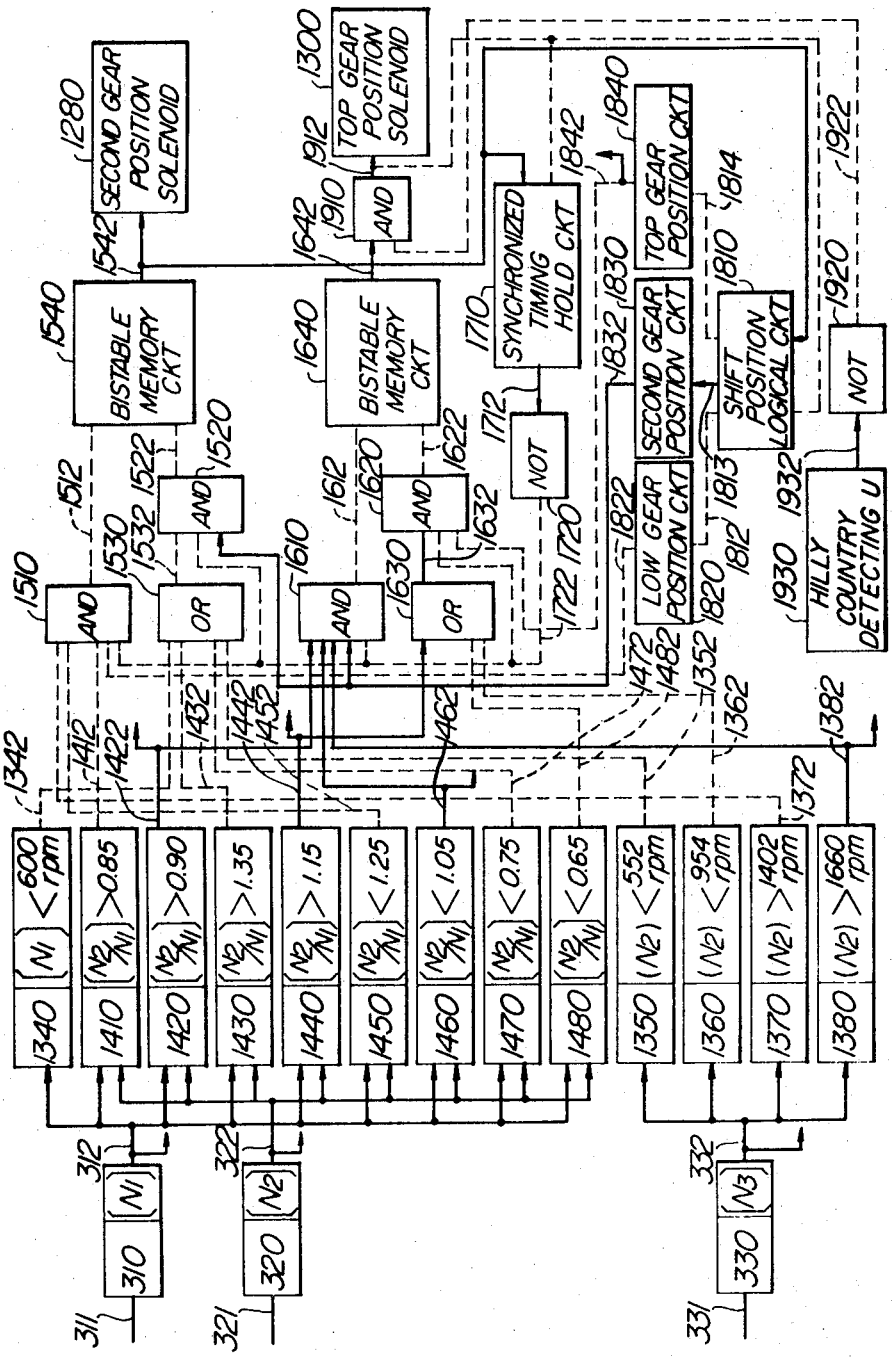
Figure 38:
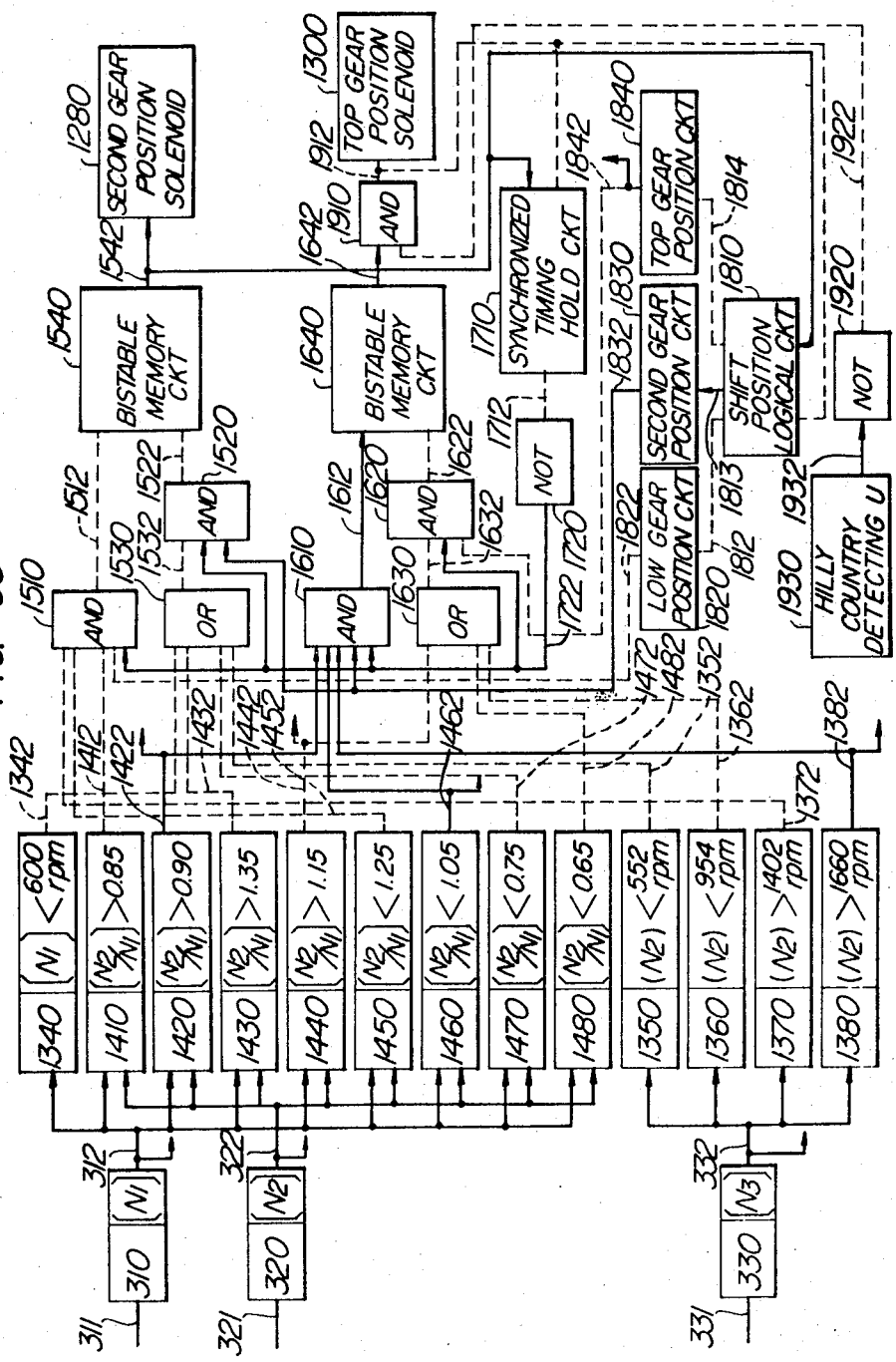

FIG. 37 is a block diagram for explaining the gearshifting logic operation which takes place when a signal is provided by the hilly country detecting unit and the logic operation which takes place while the synchronized timing holding signal is maintained; and FIG. 38 is a block diagram for explaining the logical operation which takes place when the synchronized timing holding signal has been extinguished following the logic operations in FIG. 37.

Figure 1:
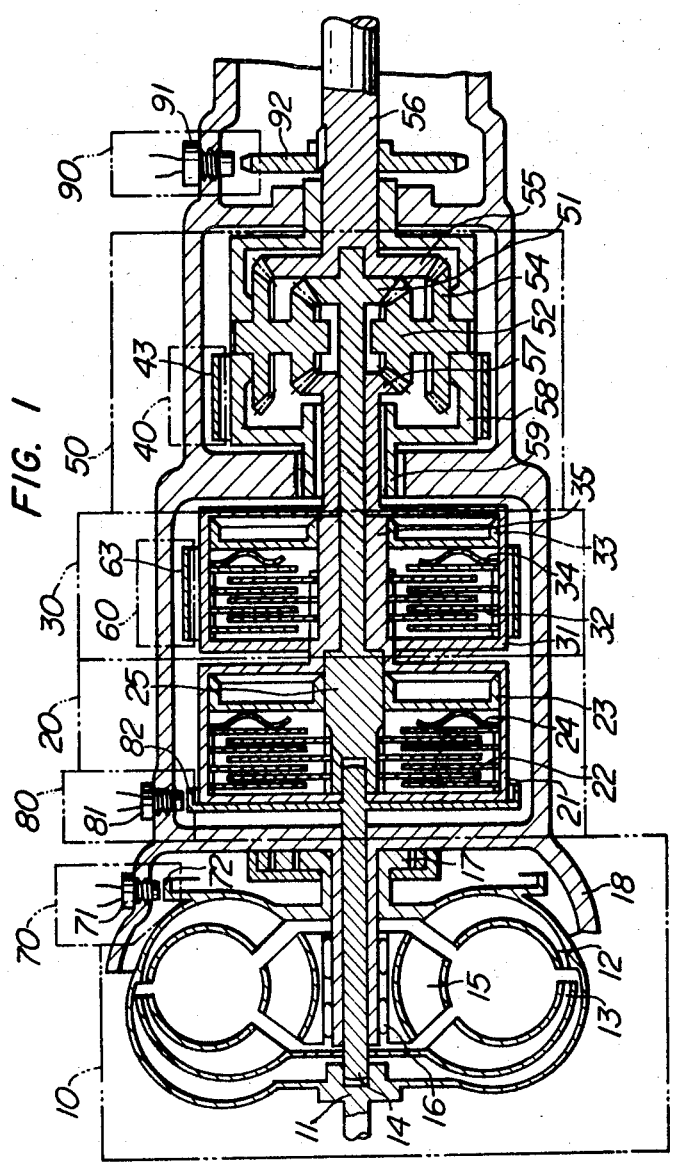
FIG. 1 is a sectional view of an embodiment of a transmission incorporating the present invention.

The present invention will now be explained in reference with the illustrated embodiments. The torque converter transmission will be explained referring by way of an example to a three forward speed torque converter automatic transmission as shown in FIG. 1.

Needless to say, the present invention is not limited to the three forward speed automatic transmission and it can be likewise embodied in an automatic transmission having more than four speeds or automatic transmission having two or less speeds. It can also be embodied in a gear transmission as well as in any other known transmission systems. Now referring to the three forward speeds torque converter automatic transmission, it comprises a torque converter 10, a front clutch 20, a rear clutch 30, a rear brake 40, a gear train 50 and a front brake 60.

Directly coupled to a pump shaft 11 of the torque converter 10 is the revolving output shaft of an internal combustion engine which is not shown and the torque converter pump shaft 11 is directly coupled to a torque converter pump 12. The torque converter 10 comprises the pump 12, a turbine 13 opposing the pump 12 and a stator 15 disposed therebetween and provided with a one-way clutch 16. While the operations of these members will not be explained in detail since they are well known in the art, the pump 12 supplies a circulating fluid flow and the turbine 13 transmits a turning effort to a torque converter turbine shaft 14 by virtue of the momentum of the circulating fluid flow.

In other words, the turning effort is transmitted between the pump 12 and the turbine 13 with a difference in revolutions between the two members in the well-known manner, whereupon these members function to transmit varying turning efforts such that the torque transmitted at the output is small with a small difference in the revolutions and a large torque is transmitted at the output when there is a big difference in the revolutions. The speed difference just referred to will be differently expressed in terms of the amount of slip (slip ratio).

An oil pressure pump 17 consists of a gear pump which is directly coupled to the torque converter pump shaft 11 for the purposes that will be discussed later. The front clutch 20 is composed of a clutch drum 21 which is integrally coupled to the torque converter turbine shaft 14, a multiple-plate clutch 22, a clutch piston 23, a spring plate 24 and a clutch shaft 25, so that when an actuating oil pressure is applied to the clutch piston 23, the turbine shaft 14 and the clutch shaft 25 are caused to engage with each other by means of the front clutch 20.

The rear clutch 30 is composed of a clutch shaft 35 which is integrally coupled to the clutch drum 21, a clutch drum 31, a multiple-plate clutch 32, a clutch piston 33 and a plate spring 34, whereby when an actuating oil pressure is applied to the clutch piston 33, the multiple-plate clutch 32 causes the drum 21 and the drum 31 to engage with each other.

The rear brake 40 comprises, as shown in FIG. 2, a brake piston 41, a brake link 42, a brake band 43, a return spring 44 and a brake cylinder 45. When an actuating oil pressure is applied to the brake cylinder 45, the brake band 43 is applied to tighten so that a carrier 58 of the gear train 50 is held against rotation with respect to a housing 18.

The front brake 60 comprises, as shown in FIG. 2, a brake piston 61, a brake link 62, a brake band 63, a return spring 64 and brake cylinder 65 and 66. Thus, as an actuating oil pressure is applied to the brake cylinder 65, the brake band 63 is applied to tighten so that the clutch drum 31 of the rear clutch 30 is held against rotation with respect to the housing 18, while the brake band 63 is released to make the clutch drum 31 rotatable with respect to the housing 18 when an actuating oil pressure is applied to the brake cylinder 66.

The friction engaging means consisting of these clutches and brakes is identical with those which are known in the art. As shown in FIG. 1, the gear train 50 comprises, for example, a primary sun gear 51, a secondary sun gear 57, a third sun gear 55, a primary planetary gear 52, a secondary planetary gear 54, an output shaft 56 and a carrier 58. The gear train 50 constitutes a so-called planetary bevel-gear system wherein the primary sun gear 51 and the secondary sun gear 57 engage with the primary planetary gear 52 oppositely, and the secondary planetary gear 54 is integrally formed with the primary planetary gear 52 so that it is adapted to mesh with the third sun gear 55.

The gear train 50 provides the following shifting gear engagements. In the third speed position (top gear position), the front clutch 20 and the rear clutch 30 are both engaged so that the primary sun gear 51 and the secondary sun gear 57 rotate at the same speed and the carrier 58 remains idling. Thus, the rotation of the two sun gears 51 and 57 is directly transmitted to the output shaft 56 and the rotation is transmitted from the torque converter pump shaft 11 to the output shaft 56 at the 1 : 1 gear ratio as will be apparent from FIG. 1. In the second speed position (second gear position), the front clutch 20 is engaged and the front brake 60 is applied so that the input rotation is added to the primary sun gear 51 and the secondary sun gear 57 is held stationary by the front brake 60 with the carrier 58 not being held against rotation. Thus, the engagement of the primary sun gear 51 and the primary planetary gear 52 causes the output shaft 56 to rotate at 1/K1 times the speed of the input rotation with K1 being the gear ratio. In the first speed position (first gear position), the front clutch 20 is engaged and the rear brake 40 is applied so that the input rotation is applied to the primary sun gear 51 and the carrier 58 is held against rotation. Thus, the engagement between the primary sun gear 51 and the primary planetary gear 52 and the engagement between the secondary planetary gear 54 and the third sun gear 55 cause the output shaft 56 to rotate at 1/K2 times the speed of the input rotation, where K2 is the gear ratio larger than the value of K1. In the reverse position, the rear clutch 30 is engaged and the rear brake 40 is applied with the result that the input rotation is applied to the secondary sun gear 57, the primary sun gear 51 remains idle and the carrier 58 is held stationary by the rear brake 40. Thus, the output shaft 56 now rotates in the reverse direction and the speed of this reverse rotation of the output shaft 56 is 1/K2 times the speed of the input rotation.

The following table gives a summary of the gear engagements described above:

| | Front clutch (20) | Rear clutch (30) | Front brake (60) | Rear brake (40) |
|---|---|---|---|---|
| Reverse 'R' | | Engaged | | Applied |
| Forward 1st gear position | Engaged | | | Applied |
| 2nd gear position | Engaged | | Applied | |
| D Top gear position | Engaged | Engaged | | |
| L Low gear position | Engaged | | | Applied |

A torque converter pump shaft revolution detecting means 70 comprises a revolution detector 71 (the details will be described later) mounted on the housing 18 and a toothed disk 72 mounted on the torque converter pump. Thus, if the toothed disk 72 has $n_1$ teeth, the revolution detector 71 produces an electrical signal $S_1$ having a frequency $n_1$ times the number of revolutions $N_1$ of the torque converter pump 12. In this case, since the revolving output shaft of the internal combustion engine is integrally connected with the torque converter pump shaft 11, the detected electrical signals represent in fact the detection of the number of revolutions of the internal combustion engine ($S_1 = n_1 \cdot N_1$). A torque converter turbine shaft revolution detecting means 80 is composed of a revolution detector 81 (which may be of identical construction to 71) mounted on the housing 18 and a toothed disk 82 (which may be identical in construction as 72). The toothed disk 82 is mounted on the clutch drum 21 which is integral with the torque converter turbine shaft 14, so that if the number of teeth in the disk 82 is $n_2$ (for example, $n_2 = 32$), the revolution detector 82 generates an electrical signal $S_2$ having a frequency which is $n_2$ times the number of revolutions $N_2$ of the turbine shaft 14 ($S_2 = n_2 \cdot N_2$). Instead of detecting by means of the detector 80, the detection of the revolutions of the turbine shaft 14 may be replaced by the computation of a value detected at a different place such a the one which is designated for an output shaft revolution detecting means 90 (as will be discussed later), and moreover, the objective of the present invention may be achieved as a matter of fact by detecting the revolutions at any place to which the revolutions of the turbine shaft 14 are transmitted in direct drive coupling.

An output shaft revolution detecting means 90 comprises a revolution detector 91 (which may be of the identical construction as 71 and 81) mounted on the housing 18 and a toothed disk 92 integrally coupled to the output shaft 56, so that if the number of teeth in the disk 92 is $n_3$ (for example, $n_3 = 32$), the revolution detector 91 generates an electrical signal $S_3$ having a frequency which is $n_3$ times the number of revolutions $N_3$ of the output shaft 56 ($S_3 = n_3 \cdot N_3$). Assuming that K represents the gear ratio, the relationship as expressed by the following formulas hold between the signals $S_2$ and $S_3$:

$$S_2 = K(n_2/n_3)S_3$$

or $$S_3 = (n_3/n_2 \cdot K) \cdot S_2$$

where $K = N_2/N_3$ (gear ratio). In other words, it is to be understood that the revolutions $N_2$ of the torque converter turbine shaft can also be derived from the output shaft revolutions $N_3$ according to these formulas.

The detection of the revolutions $N_3$ of the output shaft 56 is equivalent to the detection of the driving conditions of a vehicle, i.e., the car speed, while the detection of the revolutions $N_1$ of the torque converter pump shaft 11 corresponds to the revolutions of the internal combustion engine. Likewise, the detection of the ratio between the revolutions $N_1$ of the pump shaft 11 and the revolutions $N_2$ of the turbine shaft 14 is equivalent to the detection of the speed ratio between the pump shaft 11 and the turbine shaft 14, and this in turn means the detection of the slip ratio in the torque converter which gives an indication of the torque being transmitted by the torque converter at that instant.

Figure 6:
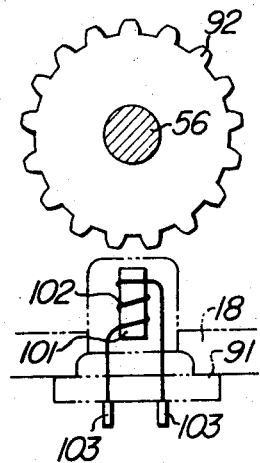
FIG. 6 is a schematic diagram showing the construction of a revolution detecting means used with the control system shown in FIG. 4.

Referring now to FIG. 6, the construction of the output shaft revolution detecting means 90 will be explained hereunder by way of an example. The toothed disk 92 concentrically secured on the output shaft 56 is composed of a disk-shaped magnetic material having formed on the periphery thereof 32 teeth which are spaced apart at equal intervals, and the revolution detector 91 is mounted on the housing 18 at a position adjacent to the diametrical outer periphery of the disk 92. The revolution detector 91 is composed of a permanent magnetic 101 and a coil 102 wound on the magnet 101, which are housed within a suitable case of non-magnetic material, and the detector 91 is mounted on the transmission housing 18 by means of this case such that the end of the permanent magnet 101 is located close to the outer periphery of the toothed disk 92. As the toothed disk 92 rotates so that the teeth on the disk 92 pass through the magnetic field produced by the permanent magnet 101, the leakage flux in the permanent magnet 101 changes thereby causing an electromotive force in the coil 102. In the case of the illustrated embodiment, 32 voltage signals will be generated for a rotation of the toothed disk 92. Generally, as previously explained, where $N_3$ represents the number of revolutions made in a unit time by the toothed disk 92 having $n_3$ teeth, the voltage signal will be provided in the form of an AC voltages $S_3$ having a frequency $n_3 \times N_3$. In the figure, numeral 103 designates the output terminals of the detector.

The toothed disks 72 and 82 in the torque converter pump shaft revolution detecting means 70 and the torque converter turbine shaft revolution detecting means 80, respectively, have the same external shape as the aforesaid toothed disk 92 and they differ from the latter only with respect to the manner in which they are fixed to the torque converter and the clutch drum, respectively. The output signal voltages $S_1$, $S_2$ and $S_3$ of the three revolution detecting means 70, 80 and 90 are respectively delivered on connecting lines 311, 321 and 331 shown in FIG. 4.

Now referring to FIG. 2, there is illustrated a diagram of a hydraulic actuation circuit used with the transmission described above. FIG. 2 shows the arrangement of the oil pressure in the second gear position.

In this figure, an oil passage 221 leading to a manually operated shift region setting valve 1260 is forked into two branches and an oil passage 1222 from the shift region setting valve 1260 is divided into two branches one of which communicates with a first distributor valve 1270. An oil passage 1223 from the first distributor valve 1270 is forked into two branches such that one of the branches directly communicates with the brake cylinder 65 of the front brake 60 and the of the branch leads to a second distributor valve 1290. An oil passage 1310 from the second distributor valve 1290 leads to the rear clutch 30 and the cylinder 66 of the front brake 60, respectively. The two distributor valves 1270 and 1290 are provided with solenoids 1280 and 1300 formed on their respective valve spool 1272 and 1292, so that the gear engagements required for the first, second and top gear positions are provided by the various combinations of the operating conditions of the two solenoids as shown in the following table:

| | Solenoid 1280 | Solenoid 1300 |
|---|---|---|
| First gear position | | |
| Second gear position | Energized | |
| Top gear position | Energized | Energized |

As the solenoid 1280 is energized, the first distributor valve 1270 has its valve spool 1272 moved into its leftward position in the illustration thus communicating the oil passages 1222 and 1223 with each other, while on the other hand the valve spool 1272 is moved into its rightward position as shown in the illustration upon deenergization of the solenoid to thereby disconnect the oil passages 1222 and 1223 and communicate the oil passages 1222 and 1227 with each other.

When the second distributor valve 1290 is in position as shown in the illustration, the oil passages 1223 is disconnected with the oil passage 1310. Upon energization of the solenoid 1300, however, the valve spool 1292 is moved to the left so that the oil passages 1223 and 1310 communicate with each other.

Next, the shift regions and the construction of an embodiment of the control system will be discussed hereunder with reference to a case wherein the present invention is applied to a three forward speed automatic transmission.

Figure 3A:
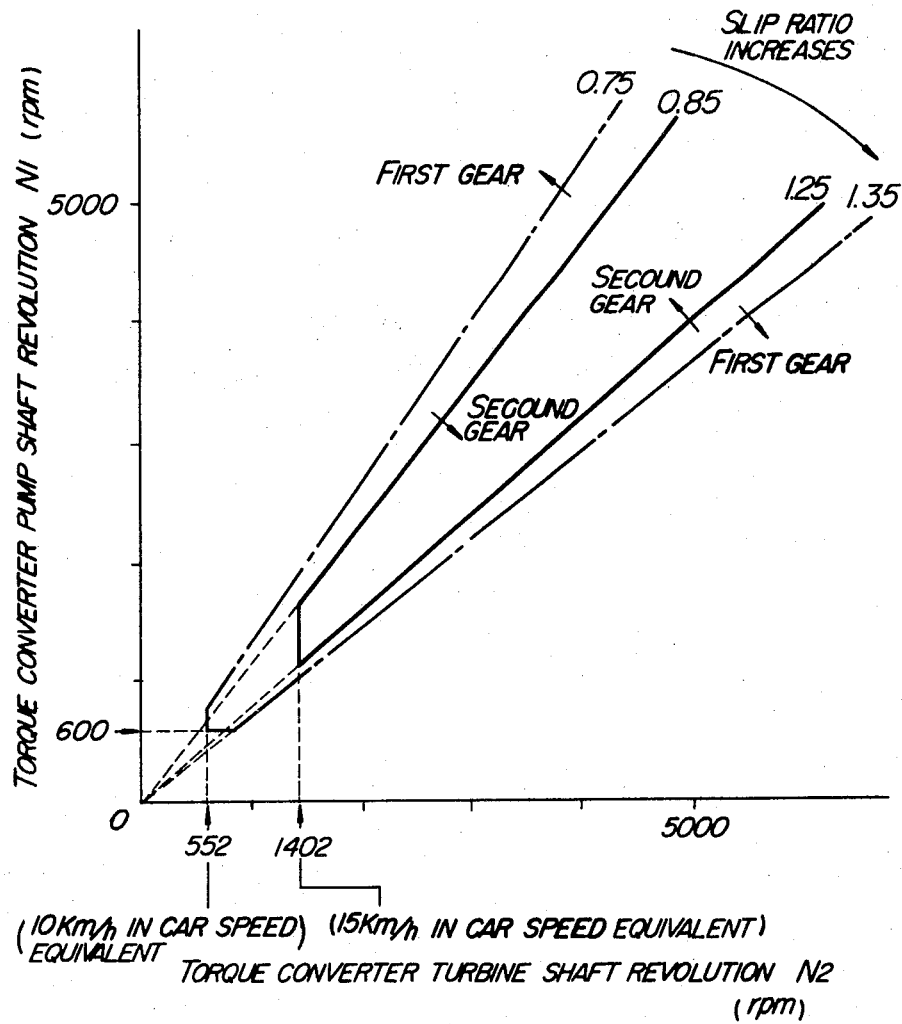
FIGS. 3A and 3B are diagrams showing an example of the shift regions, respectively.
Figure 3B:
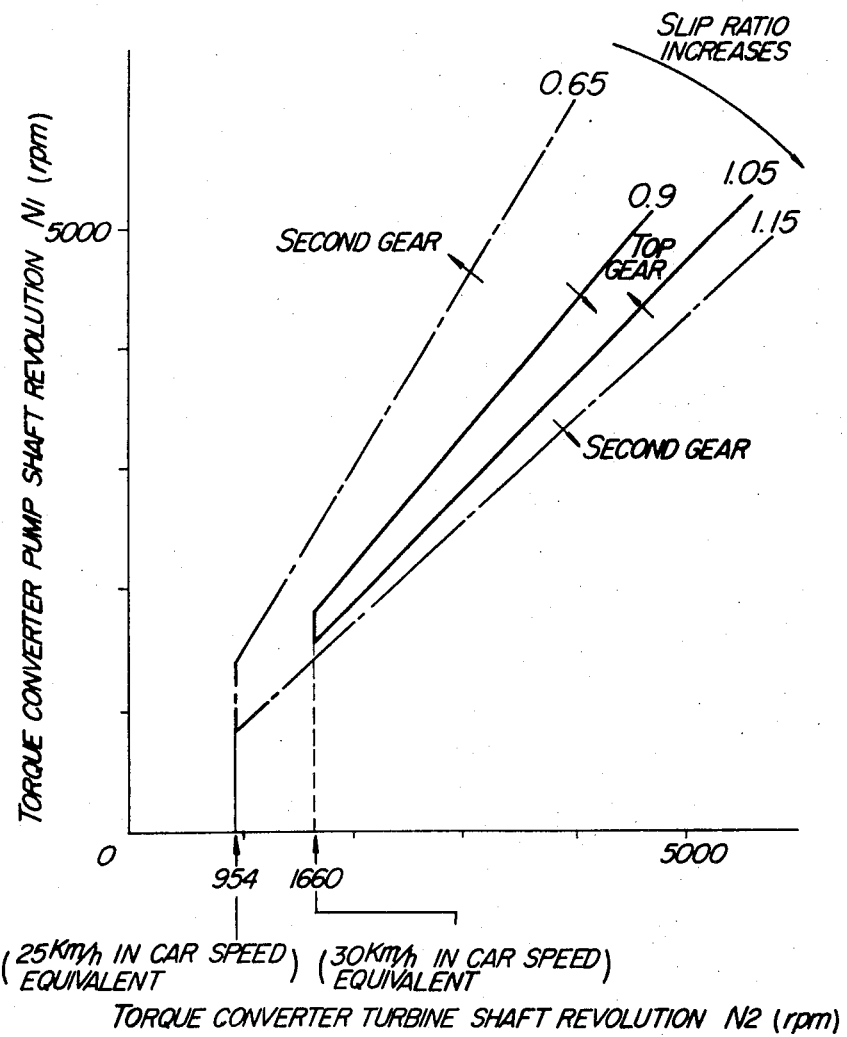

The shift regions for the three forward speed automatic transmission embodying the present invention involve: (1) the internal combustion engine speed (rpm) limits; (2) the car speed limits; and (3) the slip ratio limits, and FIGS. 3A and 3B illustrate an example of these limits according to some results of the tests conducted by the inventors.

1. Internal combustion engine speed limits

In order to effect a shift from the first gear (1st speed) position to the second gear (2nd speed) position, the lower limit is not specifically set for the engine rpm (torque converter pump shaft rpm), although it will be of the order of $N_1 = 1100$ rpm in consideration of the slip ratio and the car speed. In shifting from the second gear (2nd speed) position to the first gear (1st speed) position, the lower limit is set to the torque converter pump shaft revolution $N_1 = 600$ rpm, which corresponds to the speed limit at which no limit is specifically set to the torque converter pump shaft revolutions with respect to the gear change from the second gear (2nd speed) position to the top gear (3rd speed) position (FIG. 3), the corresponding speed will be of the order of $N_1 = 1600$ rpm in consideration of the slip ratios and the car speeds.

2. Car speed limits

In an automobile, when shifting from the first gear position to the second gear position, the lower limit is set to the torque converter turbine shaft revolution $N_2 = 1402$ rpm (15 Km/h in car speed equivalent) in consideration of the fact that driving in the second gear position at a very low speed tends to restrict the freedom of the acceleration and deceleration. On the contrary, when shifting from the second gear position to the first gear position, the lower limit is set to the torque converter turbine shaft revolution $N_2 = 552$ rpm (10 Km/h in car speed equivalent), because the shift may be more advantageous effected at a lower car speed from the view point of the noise or the like. On the other hand, for the shifting from the second gear position to the top gear position, the lower limit is also set to the torque converter turbine shaft revolution $N_2 = 1660$ rpm (30 Km/h in car speed equivalent) so that the shifting will not take place at a very low speed, whereas the lower limit is set to the torque converter turbine shaft revolutions $N_2 = 954$ rpm (25 Km/h in car speed equivalent) for the shift from the top gear position to the second gear position in consideration of the noise and the like.

3. Slip ratio limits

During normal driving when the torque is transmitted to the output shaft 56 by the torque converter from the internal combustion engine, it is preferable to make a gear change within the region where the slip ratio is between 0.5 and 1.0 so as to ensure a good performance of the torque converter. Consequently, the slip ratio is set to 0.85 for the shift from the first gear position to the second gear position and to 0.75 for the shift from the second gear position to the first gear position. On the other hand, the slip ratio is set to 0.9 for the shift from the second gear position to the top gear position and to 0.65 for the shift from the top gear position to the second gear position.

When the torque is transmitted from the output shaft 56 to the internal combustion engine through the torque converter, that is, under the engine braking condition, the slip ratio of the torque converter remains substantially within the range between 0.95 and 1.4. Thus, the slip ratio is set to 1.25 for the shift from the first gear position to the second gear position and to 1.35 for the shift from the second gear position to the first gear position. Moreover, the slip ratio is set to 1.05 for the shift from the second gear position to the top gear position and to 1.15 for the shift from the top gear position to the second gear position.

Now, with reference to the embodiment shown in FIG. 4, the construction of the control system will be explained with reference to a case wherein the present invention is applied to the three forward speed automatic transmission.

Figure 4:
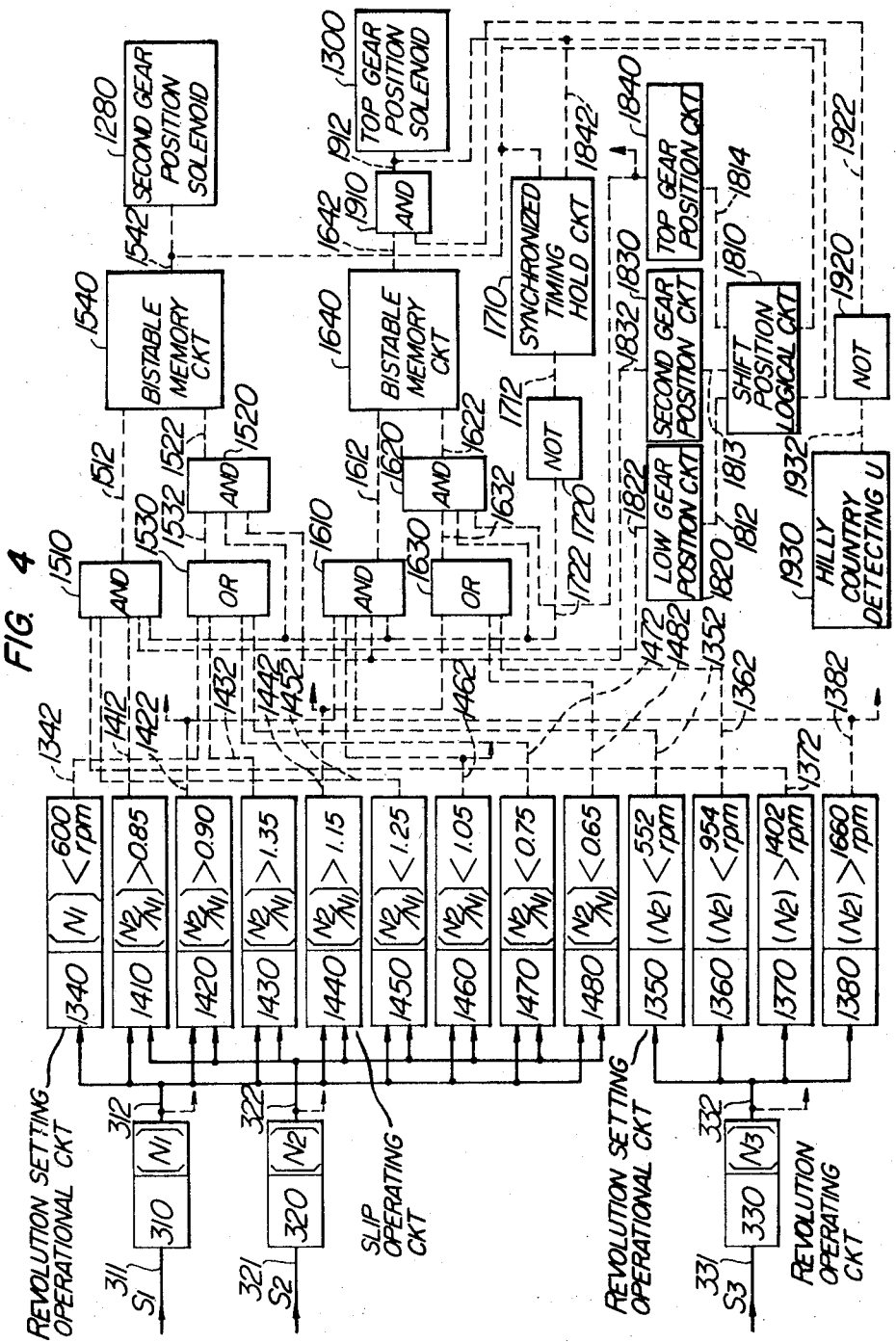
FIG. 4 is a block diagram showing the construction of a control system embodying the present invention.

The construction of the control system incorporating a hilly country detecting unit (1930) is as shown in FIG. 4 and it comprises revolution operating circuits (310, 320, 330) for computing the revolutions of the torque converter pump shaft, torque converter turbine shaft and output shaft, respectively; a hilly country detecting unit (1930); eight slip operating circuits (1410, 1420, 1430, 1440, 1450, 1460, 1470, 1480); five revolution setting operational circuits (1340, 1350, 1360, 1370, 1380); five AND circuits (1510, 1520, 1610, 1620, 1910); two OR circuits (1530, 1630); two bistable memory circuits (1540, 1640); a synchronized timing hold circuit (1710); two NOT circuits (1720, 1920) (a synchronized timing holding means is formed by the synchronized timing hold circuit 1710 and the NOT circuit 1720); three gear position circuits (1820, 1830, 1840); and a shift position logical circuit 1810 with a gear position signal generating means being provided by the gear position circuits (1820, 1830, 1840) and the shift position logic circuit 1810.

In addition, running condition signal generating means is provided by the slip operating circuits (1410, 1420, 1430, 1440, 1450, 1460, 1470, 1480) and the revolution setting operational circuits (1340, 1350, 1360, 1370, 1380).

The component elements described above will now be explained in detail. The torque converter pump shaft, torque converter turbine shaft and output shaft revolutions operating circuits 310, 320 and 330 are electrical circuits and the input thereto is provided by the combination of the toothed disk 92 and the coil 102 wound on the permanent magnet 101 a shown in FIG. 6 so that, as shown in FIG. 7, the input voltage having a frequency proportional to the revolutions is first amplified in amplitude by an amplifier circuit 313 so as to obtain an amplitude limited rectangular wave voltage through an amplitude limiting circuit 314 and this voltage is then converted into an output voltage proportional to the revolutions by means of a frequency-DC voltage conversion circuit 315. A first embodiment of the hilly country detecting unit 1930 is illustrated in FIG. 5 and it comprises a downhill road condition logic circuit 3100, a climbing road condition logic circuit 3200, a hilly country releasing condition logic circuit 3300, OR circuits 3400 and 3500, and a bistable multivibrator 3600.

Figure 8:
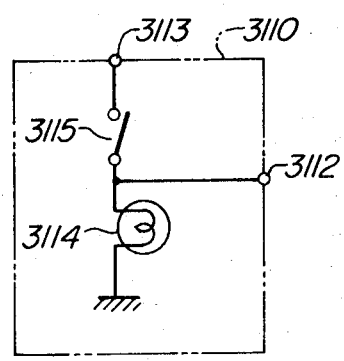
FIG. 8 is an electrical wiring diagram showing an embodiment of a braking lamp lighting signal generating circuit used with the hilly country detecting unit shown in FIG. 5.

The downhill road condition logical circuit 3100 will be explained in the first place. The downhill road condition logical circuit 3100 comprises a braking lamp lighting signal generator 3110, a vehicle acceleration detection signal generator 3120, a time gate circuit 3130 and an AND circuit 3140. The AND circuit 3140 receives input signals through output lines 3112, 3132, 1842 and 1442 of the braking lamp lighting signal generator 3110, time gate circuit 3130, top gear position circuit 1840 and slip ($[N_2/N_1] > 1.15$) operating circuit 1440, respectively, so that the AND circuit 3140 generates an output signal on an output line 3142 when the input signals are introduced at its inputs from all of the aforesaid output lines. The braking lamp lighting signal generator 3110 comprises, as shown in FIG. 8, a source power supply terminal 3113, a line 3112 through which output signals are delivered, a braking lamp 3114 and a braking lamp switch 3115. One end of the braking lamp switch 3115 is connected to the source power supply terminal 3113 and the other end is connected to one end of the braking lamp 3114 and the line 3112, and the other end of the braking lamp 3114 is grounded. As the switch 3115 is closed upon depression of a brake pedal, the power from the power source is instantly supplied through the source power supply terminal 3113 to the braking lamp 3114, so that the lamp is lit and an output signal (voltage) appears on the line 3112.

Figure 9:
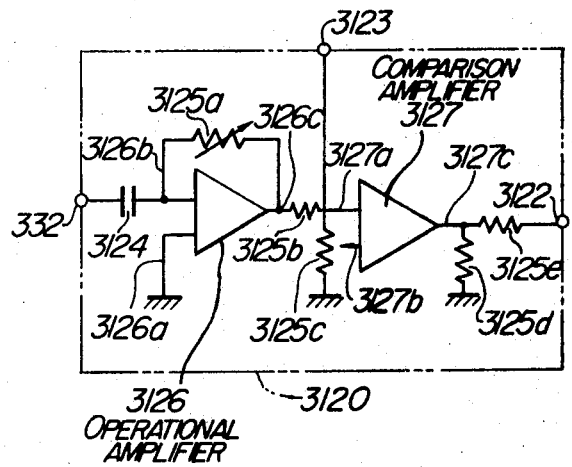
FIG. 9 is an electrical wiring diagram showing an embodiment of a vehicle acceleration detection signal generating circuit used with the detecting unit of FIG. 5.

The construction and operation of the vehicle acceleration detection signal generator 3120 will now be explained in reference with FIG. 9 which illustrates an embodiment of the circuit. In the figure, numeral 3122 designates an output signal terminal of the vehicle acceleration detection signal generator 3120; 332 an input line for receiving the output signal from the output shaft revolution operating circuit 330; 3123 a source power supply terminal; 3124 a capacitor; 3125a a variable resistor; 3126 an operational amplifier circuit (see Numazawa et al., U.S. Pat. No. 3,645,366, Feb. 29, 1972) (an embodiment of the circuit according to the present invention consists of a high gain wideband integrated operational amplifier circuit PC51 manufactured by Nippon Denki K.K., but the power source of the integrated circuit is not shown in the figure); 3125b a resistor for controlling the output signal level of the operational amplifier circuit 3126; 3125C a variable resistor for setting a comparison reference voltage; 3127 a comparison amplifier circuit (see Ito et al., U.S. Pat. No. 3,646,835, Mar. 7, 1972) (as an embodiment of the circuit according to the present invention, a high speed comparison integrated amplifier circuit PC71 manufactured by Nippon Denki K.K. is employed, but the power source of the integrated circuit is not shown in the figure); 3125d and 3125e resistors for controlling the output signal level of the comparison amplifier circuit 3127. An input terminal 3126a of the operational amplifier circuit 3126 is grounded and the other input terminal 3126b is connected to one end of the capacitor 3124 and one end of the variable resistor 3125a, while the other end of the capacitor 3124 is connected to the output line 332 (the input line of the vehicle acceleration detection signal generator 3120) and the other end of the variable resistor 3125a is connected to an output terminal 3126c of the operational amplifier circuit 3126. A differentiator circuit of the well-known type is formed by the capacitor 3124, variable resistor 3125a and operational amplifier circuit 3126. The output terminal 3126c of the operational amplifier circuit 3126 is connected to an input terminal 3127a of the comparison amplifier circuit 3127 through the resistor 3125b, while an input terminal 3127b of the comparison amplifier circuit 3127 is connected to the variable terminal of the variable resistor 3125c one of whose fixed terminals is connected to the source power supply terminal 3123 and the other fixed terminal to the ground. When a DC voltage proportional to the vehicle speed is applied to the line 332, a voltage proportional to the acceleration is developed across the output terminal 3126c of the operational amplifier circuit 3126 by the differentiator circuit composed of the capacitor 3124, variable resistor 3125a and operational amplifier circuit 3126. The sensitivity of the acceleration can be controlled by the variable resistor 3125a. Here, it is assumed that the reference setting of the input terminal 3127b of the comparison amplifier circuit 3127 is adjusted such that a signal appears at the output terminal 3127c of the comparison amplifier circuit when the acceleration 0.016 g [X9.8 m/sec$^2$] is exceeded. The resistors 3125d and 3125e are intended to provide a circuit matching with the time gate circuit 3130 connected to the output signal terminal 3122 and the resistors control the level of signals delivered on the line 3122. In other words, the vehicle acceleration detection signal generator 3120 operates such that with the application of a DC voltage proportional to the vehicle speed (output shaft revolutions) to the line 332, a signal (voltage) is generated on the line 3122 when the acceleration 0.016 g [X9.8 m/sec$^2$] is exceeded.

Figure 10:
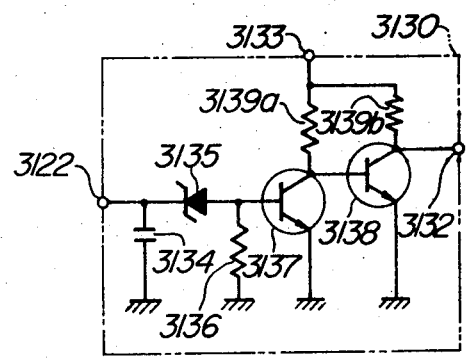
FIG. 10 is an electrical wiring diagram showing an embodiment of a time gate circuit used with the detecting unit of FIG. 5.

The construction and operation of the time gate circuit 3130 will now be explained with reference to FIG. 10 illustrating an embodiment of this circuit. In the figure, numeral 3132 designates an output line on which the output signal of the time gate circuit is taken; 3133 a source power supply terminal; 3122 a line through which the input signal is applied to the time gate circuit 3130 and on which the output signal is delivered from the vehicle acceleration detection signal generator 3120. Numeral 3134 designates a capacitor; 3135 a reference diode; 3136 a resistor; 3137 and 3138 transistors; 3139a the collector resistor of the transistor 3137; 3139b the collector resistor of the transistor 3138. The cathode side of the reference diode 3135 is connected to the positive side of the capacitor 3134 and the line 3122, while the negative side of the capacitor 3134 is grounded. The anode side of the reference diode 3135 is connected to one end of the resistor 3136 and the base of the transistor 3137. The emitter of the transistor 3137 is connected to the ground and the collector of the transistor 3137 is connected to one end of the resistor 3139a and the base of the transistor 3138, while the other end of the resistor 3139a is connected to the source power supply terminal 3133. The emitter of the transistor 3138 is grounded and its collector is connected to one end of the resistor 3139b and the line 3132 on which the output signal is taken, and the other end of the resistor 3139b is connected to the source power supply terminal 3133. When an input signal (voltage) is applied to the line 3122, the capacitor 3134 is charged; however, assuming that the zener voltage of the reference diode is 4 volts for example, no current flows between the base and the emitter of the transistor 3137 until the potential at the cathode size of the reference diode 3135 become higher than 4 volts. When the potential at the cathode side of the reference diode 3135 become higher than the aforesaid zener voltage of 4 volts, there is a flow of current between the base and emitter of the transistor 3137 and this drives the transistor 3137 to conduction. In other words, even if an input signal (voltage) is applied to the line 3122, the conduction of the transistor 3137 can be delayed a given time (0.5 seconds according to the present invention) by means of the capacitor 3134 and the reference diode 3135 as previously described, so that any signal accidentally produced by the vehicle acceleration detection signal generator 3120 due to the vibration of the vehicle or the like may be prevented from being applied to an AND circuit 3140. With the transistor 3137 in the conduction state, a current flows from the source power supply terminal 3133 through the resistor 3139a and through the collector-emitter side of the transistor 3137 to the ground. When this happens, there is no current flow through the base-emitter side of the transistor 3138. Therefore, the transistor 3138 is cut off and the potential at the source power supply terminal 3133 appears through the resistor 3139b at the collector of the transistor 3138, that is, on the line 3132.

On the other hand, when no input signal (voltage) is applied to the line 3122, the capacitor 3134 and the reference diode 3135 remain inoperative, so that no current flows between the base and the emitter of the transistor 3137. This renders the transistor 3137 non-conductive. When this happens, the potential at the source power supply terminal 3133 appears through the resistor 3139a at the collector of the transistor 3137. This causes a current flow through the base-emitter side of the transistor 3138 which is in turn rendered conductive, so that current flows from the source power supply terminal 3133 to the ground through the resistor 3139b and thus no output signal (voltage) appears at the collector of the transistor 3138, that is, on the line 3132.

In other words, the operation of the time gate circuit 3130 is such that an output signal appears on the line 3132 at a time 0.5 seconds later than the application of an input signal to the line 3122, whereas no output signal appears on the line 3132 unless the application of an input signal to the line 3122 has been maintained at least for a period of 0.5 seconds. The function of the resistor 3136 is to provide a path for the leakage current which follows in the base emitter circuit of the transistor 3137 and it is intended to stabilize the operation of the transistor 3137.

Next, the AND circuit 3140 (see Wakamatsu et al., U.S. Pat. No. 3,641,844, Feb. 15, 1972) shown in FIG. 5 is provided to detect hilly country and it performs a logic operation to produce an output signal by considering that a downhill road is detected when all of the four conditions are satisfied, that is, when a braking lamp lighting signal is generated, the acceleration 0.016 g [X 9.8 m/sec] is generated and maintained more than 0.5 seconds, the transmission is in top gear position, and the slip ratio is larger than 1.15.

While the climbing road condition logical circuit 3200 of FIG. 5 may take various forms, it consists of a circuit adapted to generate a signal when the slip ratio becomes less than 0.65 because, for example, when the amount of slip between the pump and the turbine of a torque converter is increased owing to the steep incline of a road and the slip ratio becomes less than 0.65 while the vehicle is running in top gear, the gear ratio is changed to the second gear by virtue of the action of the control system as illustrated in the shift diagram of FIG. 3B. In this case, the output signal of the slip ($[N_2/N_1] < 0.65$) operating circuit 1480 may be utilized for this purpose. In addition, the climbing road condition logical circuit 3200 may incorporate those circuits which will generate various signals positively detecting the vehicle driving in a hilly country, such as, a circuit adapted to detect that the slip ratio will not exceed 1.0 during several seconds (about 3 seconds) after the slip ratio has become smaller than 0.65. In the case where the gear ratio has been changed to the second speed, the engine braking is no longer effected, a circuit may be adapted to detect this and also that the acceleration is less than 0.5 g. In other words, if vehicle slip ratio is a selected amount indicative of a slow speed position, exhibits marginal acceleration and no engine braking; then these conditions when detected would indicate a climbing road condition for purposes of the present invention.

Although the hilly country releasing condition logical circuit 3300 may also take various forms, a circuit is employed which generates a signal when the slip ratio remains within the range between 0.9 and 1.0 for a given time (several seconds) with the accelerator-pedal displacement being less than one-half. For this purpose, the hilly country releasing logic circuit 3300 may be composed of a signal generator for generating a signal when the accelerator position is less than one-half, two slip ratio setting circuits for generating a signal when the slip ratio is larger than 0.9 and less than 1.0 respectively, a time gate circuit, and an AND circuit adapted to generate a signal when all of the aforesaid signals are applied to the AND circuit. It is needless to say that a circuit adapted to generate a signal which gives a positive indication of a level road may be jointly used.

Figure 11:
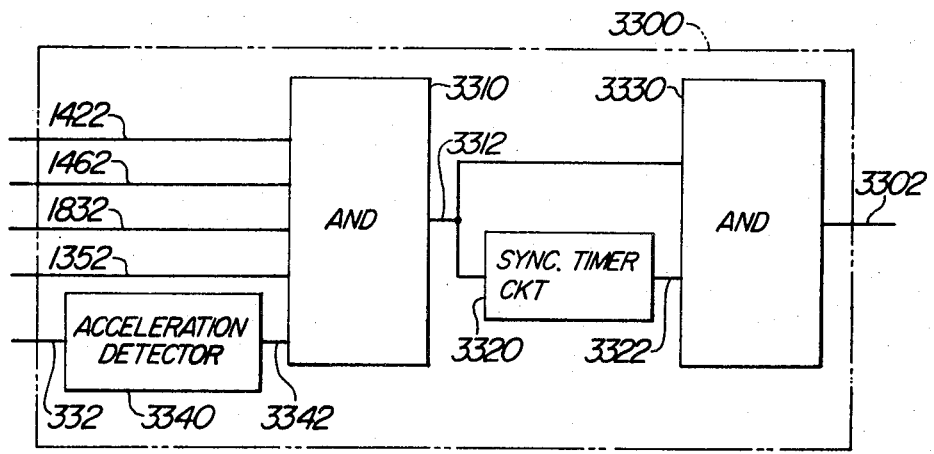
FIG. 11 is a block diagram showing an embodiment of a hilly country releasing condition logic circuit incorporated in the hilly country detecting unit shown in FIG. 5.

A specific embodiment of the aforesaid hilly country releasing condition logic circuit will be explained hereunder. In FIG. 11, an AND circuit 3310 produces a signal on its output line 3312 when the five signal elements are simultaneously applied to the AND circuit from an output line 1422 of the slip ($[N_2/N_1] > 0.90$) operating circuit 1420, output line 1462 of the slip ($[N_2/N_1] < 1.05$) operating circuit 1460, output line 1832 of the second gear position circuit 1830, output line 1352 of the revolution ($[N_2] > 1660$ rpm) setting operational circuit 1350, and output line 332 of the output shaft revolution $[N_3]$ operating circuit 330 through an output line 3342 of the acceleration detection circuit 3340. The signal on the output line 3312 actuates the synchronous timer circuit 3320 so that a signal is produced on an output line 3322 after a given time (this is experimentally determined as three seconds according to the present invention). When signals appear on both of the output lines 3312 and 3322, an AND circuit 3330 is actuated to generate an output signal on an output line 3302. The AND circuits 3310 and 3330 are of the type known in the art and produce an output signal when all of the input signals are introduced at the inputs of the respective circuits.

Figure 12:
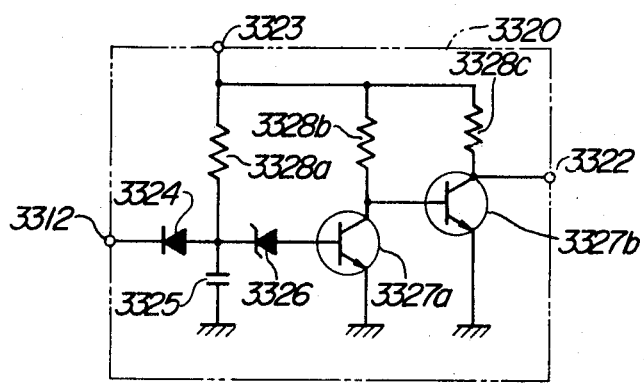
FIG. 12 is an electrical wiring diagram of a synchronous timer circuit incorporated in the hilly country releasing condition logic circuit shown in FIG. 11.

In FIG. 12, there is illustrated an embodiment of the synchronous timer circuit 3320 which is a component part of the aforesaid hilly country releasing condition logic circuit 3300 shown in the wiring diagram of FIG.

11. In FIG. 12, numeral 3322 designates a line on which the output signal of the synchronous timer circuit 3320 is taken; 3312 the line where the output signal of the AND circuit 3310 is introduced; 3323 a source power supply terminal. Numeral 3324 designates a diode; 3325 a capacitor; 3326 a reference diode; 3327a and 3327b, transistors. Numeral 3328a designates the base resistor of the transistor 3327a; 3328b the collector resistor of the transistor 3327a; 3328c the collector resistor of the transistor 3327b. The cathode side of the diode 3324 is connected to the line 3312 and its anode side is connected to one end of the resistor 3328a, positive side of the capacitor 3325 and the cathode side of the reference diode 3326 with the negative side of the capacitor 3325 being connected to the ground. The other end of the resistor 3328a is connected to the source power supply terminal 3323 and the anode side of the reference diode 3326 is connected to the base of the transistor 3327a whose emitter is grounded, while the collector of the transistor 3327a is connected to one end of the resistor 3328b and the base of the transistor 3327b and the other end of the resistor 3328b connected to the source power supply terminal 3323. The emitter of the transistor 3327b is grounded and its collector is connected to one end of the resistor 3328c and a line 3322 on which output signals are taken, while the other end of the resistor 3328c is connected to the source power supply terminal 3323. When an input signal (voltage) is applied to the line 3312, the diode 3324 is actuated such that on the anode side of the diode 3324 a voltage is applied to the positive side of the capacitor 3325 from the source power supply terminal 3323 through the resistor 3328a so that the capacitor 3325 is charged; however, assuming that the zener voltage of the reference diode 3326 is 4 volts here, no current flows through the base-emitter side of the transistor 3327a until the voltage at the cathode of the reference diode 3326 becomes higher than 4 volts. As the potential at the cathode of the reference diode 3326 exceeds the zener voltage which is 4 volts, current flows through the base-emitter side of the transistor 3327a so that the transistor 3327a conducts. In other words, even through an input signal (voltage) is applied to the line 3312, the conduction of the transistor 3327a may be delayed a given time (which is 3 seconds according to the present invention) by means of the capacitor 3325 and the reference diode 3326 as previously explained. On the other hand, when the transistor 3327a is conducting, current flows through the collector-emitter side of the transistor 3327a to the ground from the source power supply terminal 3323 through the resistor 3328b, so that no current flows the base-emitter side of the transistor 3327b and the transistor 3327b is cut off causing the potential at the source power supply terminal 3323 to be applied through the resistor 3328c to the collector of the transistor 3327b, that is, the line 3322. Furthermore, when no input signal (voltage) is applied to the line 3312, that is, when it is grounded, current flows from the source power supply terminal 3323 through the resistor 3328a and the diode 3324 and it is thus coupled to the ground. When this happens, the capacitor 3325 and the reference diode 3326 remain inoperative and there is no current flowing through the base-emitter side of the transistor 3327a.

The transistor 3327a is then cut off and the potential at the source power supply terminal 3323 is applied through the resistor 3328b to the collector of the transistor 3327a, whereupon current flows through the base-emitter side of the transistor 3327b causing the transistor 3327b to conduct and there is a current flow from the source power supply terminal 3323 through the resistor 3328c to the ground so that no output signal (voltage) appears at the collector of the transistor 3327b, that is, on the line 3322. In other words, the operation of the synchronous timer circuit 3320 is such that the appearance of an output signal on the line 3322 is delayed for three seconds after the application of an input signal to the line 3312, while no output signal is produced on the line 3322 unless the application of an input signal to the line 3322 is maintained more than three seconds.

The OR circuit 3400 shown in FIG. 5 (see also Wakamatsu et al., referred to above) is of the type well known in the art, which produces an output signal when any one of the input signals is applied thereto. Thus, as the OR circuit 3400 receives a signal from either the climbing road condition logic circuit 3200 or the downhill road condition logic circuit 3100, it drives the bistable memory circuit 3600 into one of its two stable states so as to maintain the signal on the line 1932 on. The OR circuit 3500 is also of the type well known in the art, so that upon application of a signal from the hilly country releasing condition logical circuit 3300 the OR circuit 3500 changes the bistable memory circuit 3600 into the other of the two stable states so as to keep the signal on the line 1932 off. While the OR circuit 3500 is shown in FIG. 5 because it is generally needed, the OR circuit 3500 may be dispensed with in some cases.

While the detailed explanation of the bistable memory circuit 3600 will be made later, it has for its purpose to store information representing whether the vehicle is running in a hilly country so that a signal is received from either the climbing road condition logic circuit 3200 or the downhill road condition logic circuit 3100 through the OR circuit 3400, or the vehicle is not running in a hilly country so that a signal is received from the hilly country releasing condition logic circuit 3300 through the OR circuit 3500.

Figure 13:
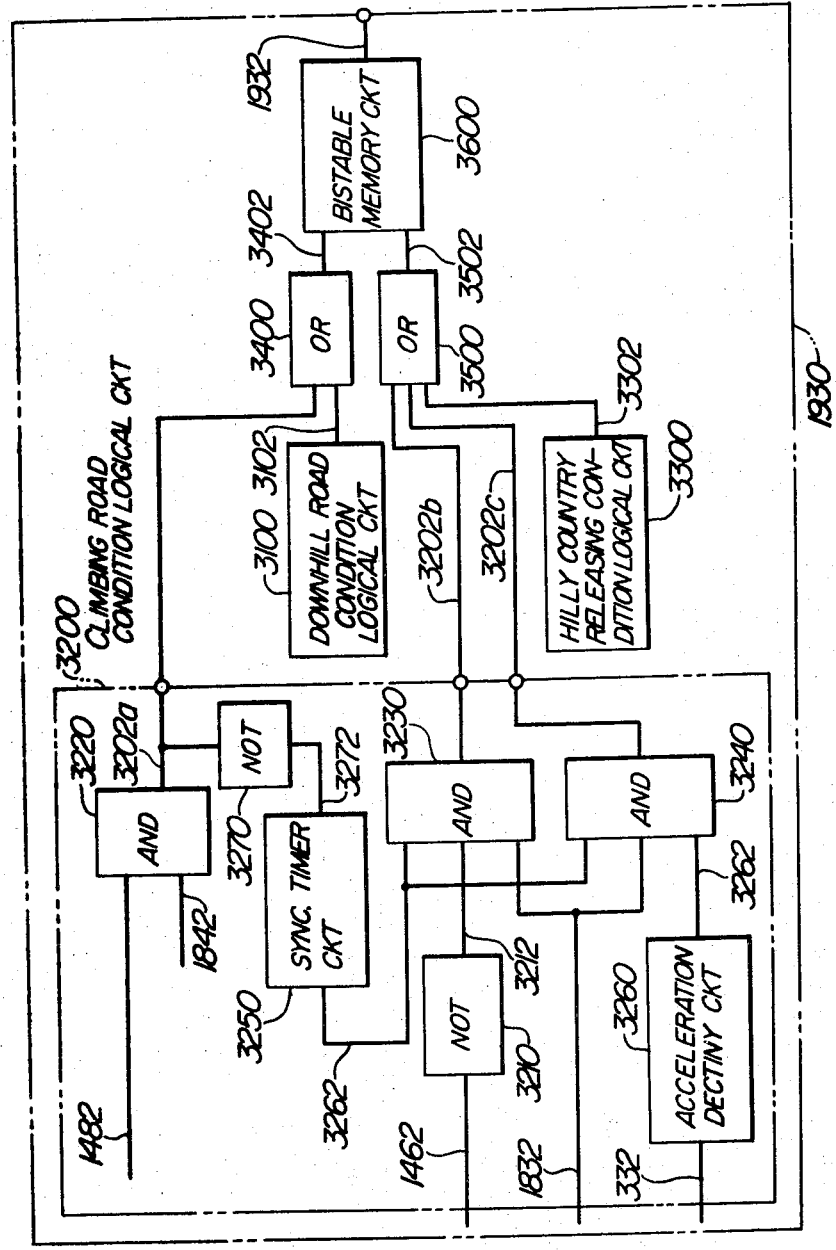
FIG. 13 is a block diagram showing the construction of a second embodiment of the hilly country detecting unit.

A second embodiment of the hilly country detecting unit 1930 which is a modification of the embodiment shown in FIG. 5 will now be explained. As shown in FIG. 13, the second embodiment of the hilly country detecting unit 1930 comprises a downhill road condition logic circuit 3100, a climbing road condition logic circuit 3200, a hilly country releasing condition logic circuit 3300, OR circuits 3400 and 3500, and a bistable memory circuit 3600, the number of the component elements being the same as that of the first embodiment shown in FIG. 5.

In the hilly country detecting unit 1930 shown in FIG. 13, the climbing road condition logic circuit 3200 generates a signal when the vehicle is running on an uphill road and it comprises, a shown in FIG. 13, two NOT circuits 3210 and 3270 (again referring to Wakamatsu et al.,), three AND circuits 3220, 3230 and 3240, a synchronous timer circuit 3250 and an acceleration detecting circuit 3260. The NOT circuits 3210 and 3270 and the AND circuits 3220, 3230 and 3240 are identical in construction with the previously mentioned NOT circuit 1720 and the AND circuit 1510, respectively. The AND circuit 3220 generates an output signal on a line 3202a when it simultaneously receives the signal from the line 1482 of the slip ($[N_2/N_1] < 0.65$) operating circuit 1480 and the signal from the line 1840 of the top gear position circuit 1840, that is, when the slip ratio becomes lower than 0.65 in FIG. 3B upon depressing the accelerator pedal so that shifting from top gear to second gear is made possible. The AND circuit 3230 generates an output signal on a line 3202b when it simultaneously receives the signal from the AND circuit 3220 through the NOT circuit 3270 and the synchronous timer circuit 3250, the signal from the line 1462 of the slip ($[N_2/N_1] < 1.05$) operating circuit 1460 through the NOT circuit 3210 and the signal from the line 1832 of the second gear position circuit 1830. In other words, the AND circuit 3230 generates a signal when the transmission changes from the top to the second gear within a given time (3 seconds) as determined by the synchronous timer circuit 3250 after the shifting from the top to the second gear has been made possible owing to the reduced slip ratio and the engine braking effect is provided with the slip ratio being larger than 1.05. On the other hand, the AND circuit 3240 generates an output signal on a line 3202c when it simultaneously receives the signal from the AND circuit 3220 through the NOT circuit 3270 and the synchronous timer circuit 3250, the signal from the line 1832 of the second gear position circuit 1830, and the signal from the acceleration ($\alpha > 0.07$ g [X9.8 m/sec$^2$]) detecting circuit 3260. That is, the AND circuit 3240 generates an output signal on the output line 3202c of the climbing road condition logical circuit 3200 when the transmission changes from the top to the second gear within a given time (3 seconds) after the shifting from the top to the second gear has been made possible by virtue of the decreased slip ratio and the acceleration of the vehicle becomes higher than a predetermined value (this situation represents the running on a level road). Then, the signal from the AND circuit 3220 is applied to the bistable memory circuit 3600 through the line 3202a of the climbing road condition logic circuit 3200, the OR circuit 3400 and its output line 3402 so that the memory circuit 3600 is driven into one of its two stable states to generate an output signal. On the other hand, the signal from the AND circuit 3230 is applied to the bistable memory circuit 3600 through the line 3202b from the climbing road condition logic circuit 3200 and the OR circuit 3500 and its output line 3502, whereupon the memory circuit 3600 is changed into the other stable state to extinguish the output signal. The signal from the AND circuit 3240 is applied to the bistable memory circuit 3600 through the output line of the 3202c of the climbing road condition logical circuit 3200 and the AND circuit 3500 and its output line 3502, whereupon the memory circuit 3600 is changed into the other stable state to extinguish the output signal. In other words, the bistable memory circuit 3600 is changed into the one stable state to produce an output signal on the output line 1932 of the hilly country detecting unit 1930 and store the information of hilly country, when the memory circuit 3600 receives the signal from the output line 3202a of the climbing road condition logic circuit 3200 but it does not receive the signals from the output lines 3202b and 3202c of the climbing road condition logic circuit 3200. On the other hand, when a signal is applied to the bistable memory circuit 3600 through either the line 3202b or 3202c of the climbing road condition logic circuit 3200, the memory circuit 3600 produces no output signal on the output line 1932 of the hilly country detecting unit 1930 and it does not store the information of hilly country irrespective of whether it receives a signal through the line 3202a. Thus, the bistable memory circuit 3600 produces an output signal by means of the necessary signal from the climbing road condition logic circuit 3200 when the shift from the top to the second gear takes place due to the reduced slip ratio (the amount of slip) of the torque converter.

The OR circuit 3500 shown in FIG. 13 is a conventional OR circuit and it produces a signal when it receives a signal from either the hilly country releasing condition logic circuit 3300 or the climbing road condition logic circuit 3200, so that the bistable memory circuit 3600 is changed into the other stable state to maintain the de-energization of the output line 1932.

Figure 14:
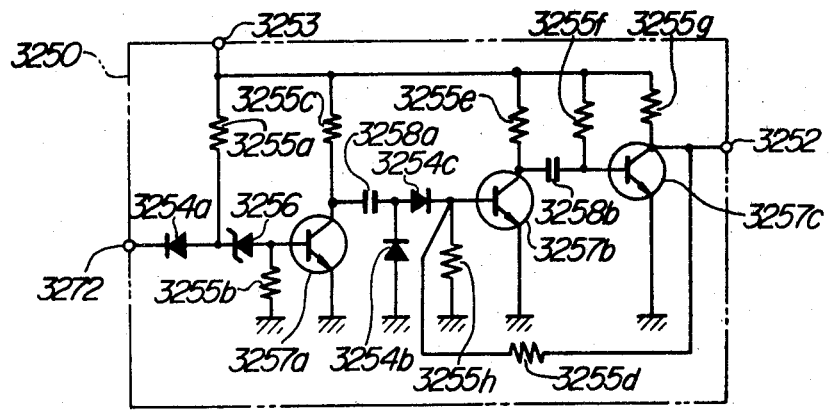
FIG. 14 is an electrical wiring diagram showing an embodiment of the synchronous timer circuit incorporated in the hilly country detecting unit shown in FIG. 13.

FIG. 14 illustrates an embodiment of the synchronous timer circuit 3250 which is a component element of the climbing road condition logic circuit 3200 shown in the wiring diagram of FIG. 13. In this figure, numeral 3272 designates a line through which the signal from the NOT circuit 3270 of FIG. 13 is applied to the synchronous timer circuit 3250; 3252 a line on which the output signal is delivered; 3253 a source power supply terminal; 3254a a diode; 3255a a resistor; 3256 a reference diode; 3255b a resistor; 3257a a transistor; 3255c a resistor; 3258a a capacitor; 3254b and 3254c, diodes; 3255H a resistor; 3257b a transistor; 3255d a resistor; 3255e a resistor; 3258b a capacitor; 3255f a resistor; 3257c a transistor; 3255g a resistor. The line 3272 for applying an input signal to the synchronous timer circuit 3250 is connected to the cathode of the diode 3254a whose anode is connected to one end of the resistor 3255a and the cathode of the reference diode 3256 and the other end of the resistor 3255a is connected to the source power supply terminal 3253, while the anode of the reference diode 3256 is connected to the base of the transistor 3257a and one end of the resistor 3255b whose the other end is grounded. The emitter of the transistor 3257a is grounded and its collector is connected to one end of the resistor 3255a and one end of the capacitor 3258a with the other end of the resistor 3255c being connected to the source power supply terminal 3253. The other end of the capacitor 3258a is connected to the cathode of the diode 3254b and the anode of the diode 3254c, while the anode of the diode 3254b is grounded and the cathode of the diode 3254c is connected to the base of the transistor 3257b, one end of the resistor 3255h and one end of the resistor 3255d. The other end of the resistor 3255c is connected to the ground and the resistor 3255d is connected to the collector of the transistor 3257c, that is, the line 3252 on which the output signal of the synchronous timer circuit 3250 is delivered, while the emitter of the transistor 3257b is grounded and its collector is connected to one end of the resistor 3255e and one end of the capacitor 3258b. The other end of the resistor 3255e is connected to the source power supply terminal 3253 and the other end of the capacitor 3258b is connected to one end of the resistor 3255f and the base of the transistor 3257c, while the other end of the resistor 3255f is connected to the source power supply terminal 3253 and the emitter of the transistor 3257c is grounded and its collector is connected to one end of the resistor 3255g and the line 3252.

When a "0" signal (a zero voltage with a zero impedance as seen from the line 3272) is applied to the line 3272 for introducing input signals to the synchronous timer circuit 3250, current flows from the source power supply terminal 3253 through the resistor 3255a and the diode 3254a. Consequently, there is no current flow through the reference diode 3256 and no current also flows through the base-emitter side of the transistor 3257a. In other words, the transistor 3257a is in the non-conduction state. When the transistor 3257a is at cut off, a voltage is applied to the collector of the transistor 3257a from the source power supply terminal 3253 through the resistor 3255c. When this happens, a voltage is applied to one end of the capacitor 3258a and current flows into the other end of the capacitor 3258a while it is being charged, so that when an input signal is applied through the diode 3254c to the monostable multivibrator of the known type comprising the resistor 3255c, transistor 3257b, resistors 3255d and 3255e, capacitor 3258b, resistor 3255f, transistor 3257c and resistor 3255g, a signal (voltage) is produced on the line 3252 for a given time (3 seconds according to the present invention) as determined by the resistor 3255f and the capacitor 3258b. On the other hand, when a "1" signal (a positive voltage with an infinite impedance as seen from the line 3272) is applied to the synchronous timer circuit 3250 through the line 3272, the transistor 3257a is actuated by the diode 3254a with the signal on the positive side thereof. In other words, a voltage is applied to the cathode of the reference diode 3256 from the source power supply terminal 3253 through the resistor 3255a so that, assuming that the zener voltage of the reference diode 3256 is 4 volts, when the potential at the cathode of the reference diode 3256 becomes higher than 4 volts, current flows through the base-emitter side of the transistor 3257a via the reference diode 3256 thereby rendering the transistor 3257a conductive. When the transistor 3257a is conducting, there is a current flow between the collector and the emitter of the transistor 3257a from the source power supply terminal 3253 via the resistor 3255c. That is, no voltage is applied to that one end of the capacitor 3258a which is connected to the collector of the transistor 3257a. Consequently, no current is supplied to the base of the transistor 3257b through the diode 3254c. In other words, the monostable multivibrator comprising the transistors 3257b and 3257c etc., is not actuated. The function of the resistor 3255b is to prevent the leakage current from being applied to the base of the transistor 3257a and it is intended to stabilize the operation of the transistor 3257a. The diode 3254b serves to cause the capacitor 3258a to discharge rapidly, whereby at the same time that the transistor 3257a conducts the charging current of the capacitor 3258a is applied to the anode of the diode 3254b through the collector-emitter side of the transistor 3257a so that the current flows to the other end of the capacitor 3258a, that is, to the cathode side of the diode 3254b to accomplish the discharging. In short, the operation of the synchronous timer circuit is such that it causes a "1" signal on the line 3252 for a period of 3 seconds when a "0" signal is applied to the line 3272, and it need not always take the form of the monostable multivibrator described above but it may take the form of any arrangement provided that those electrical signals which cause the aforesaid actions are obtained.

Figure 15:
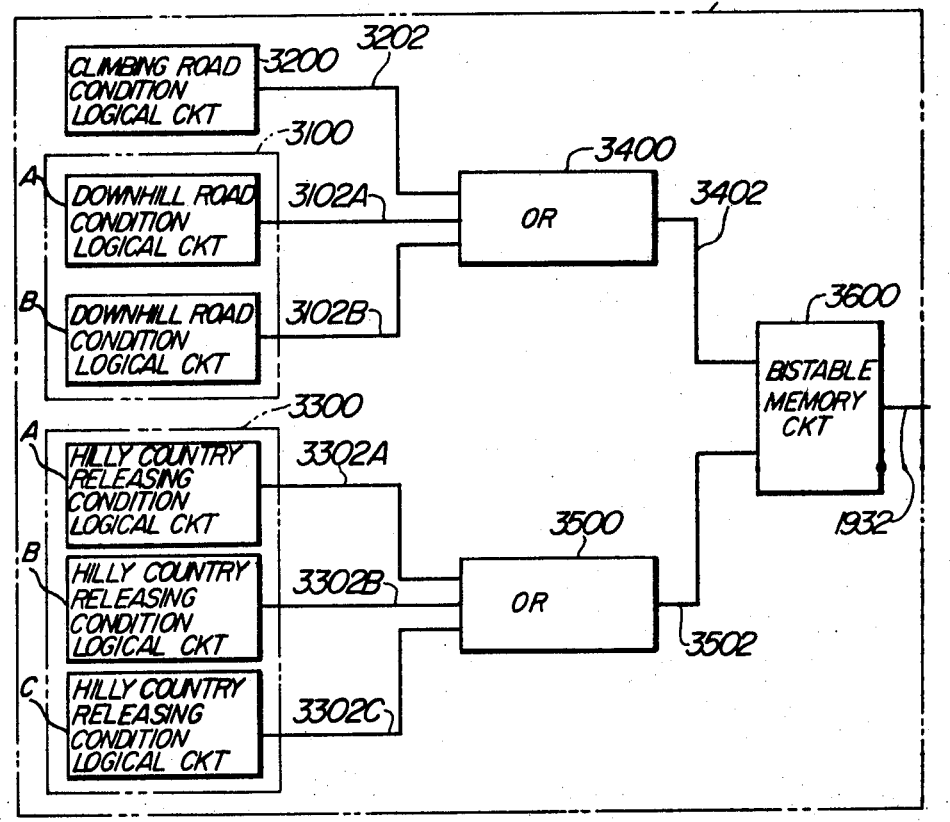
FIG. 15 is a block diagram showing the construction of a third embodiment of the hilly country detecting unit.

Next, a third embodiment of the hilly country detecting unit 1930 will be explained hereunder. In this embodiment, as shown in FIG. 15, the detecting unit 1930 comprises a climbing road condition logic circuit 3200, two downhill road condition logic circuits 3100A and 3100B, three hilly country releasing condition logic circuits 3300A, 3300B and 3300C, OR circuits 3400 and 3500, and a bistable memory circuit 3600. Thus, when a signal is provided from the single climbing road condition logic circuit 3200 or from either one of the two downhill road condition logic circuits 3100A or 3100B, the hilly country detecting unit 1930 applies this signal to the bistable memory circuit 3600 through the OR circuit 3400, so that the bistable memory circuit is placed into one of its two stable states so as to produce and maintain an output signal on the line 1932. On the other hand, when an output signal is produced by any one of the three hilly country releasing condition logic circuits 3300A, 3300B and 3300C, this output signal is applied to the bistable memory circuit 3600 through the OR circuit 3500 so that the memory circuit is changed into the other stable state so as to maintain the signal on the line 1932 off.

Figure 16:
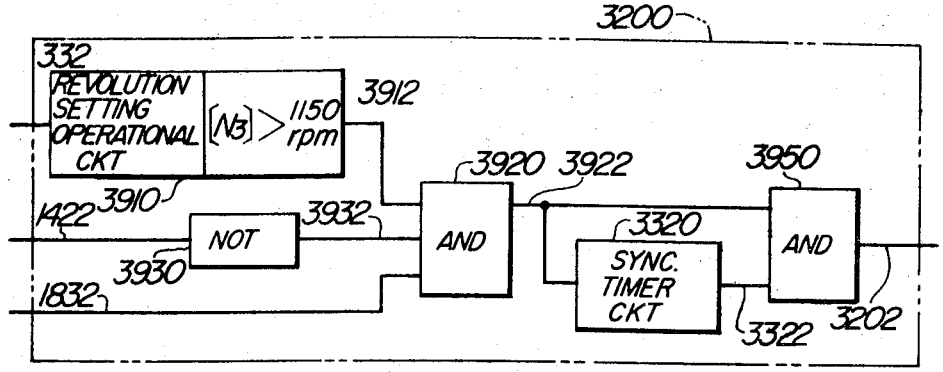
FIG. 16 is a block diagram of a climbing road condition logic circuit incorporated in the hilly country detecting unit shown in FIG. 15.

To begin with, the climbing road condition logic circuit 3200 will be explained. As shown in FIG. 16, the circuit 3200 comprises a revolution setting operational circuit 3910, and AND circuit 3920, NOT circuit 3930, a synchronous timer circuit 3320 constructed as shown in FIG. 12 and an AND circuit 3950. The AND circuit 3920 may be a conventional AND circuit which comprises, for example, a plurality of transistors connected in series with the input circuits, so that it produces an output signal when all of the input signals are applied thereto. Thus, the input signals to this AND circuit 3920 are supplied from an output line 3912 of the revolution setting operational circuit 3910, the output line 1422 of the slip ($[N_2/N_1]>0.90$) operating circuit through an output line 3932 of the NOT circuit 3930, and the output line 1832 of the second gear position circuit 1830, whereby the AND circuit 3920 produces an output signal on a line 3922 when signals are introduced at the input circuits from all of these lines. The revolution setting operational circuit 3910 is of the identical construction as the previously described revolution setting operational circuits 1340, 1350, 1360, 1370 and 1380 excepting that the input signal to the revolution setting operational circuit 3910 is the signal taken on the line 332 for delivering the output signal of the output shaft revolution operating circuit 330, so that an output signal is taken on the line 3912 when the output shaft revolution $[N_2]$ exceeds 1150 rpm (30 Km/h in car speed equivalent). The NOT circuit 3930 consists of a phase inverter circuit employing a conventional single stage amplifier circuit as previously explained. The output signal of the AND circuit 3920 is taken out through the line 3922 to provide one of the input signals to the AND circuit 3950 and the input signal to the synchronous timer 3320. Then, the output signal of the synchronous timer circuit 3320 is applied through its output line 3322 to the AND circuit 3950 as one of the input signals thereto.

The AND circuit 3950 is provided to detect a hilly country and it performs a logic operation receiving at its input the output signal of the AND circuit 3920, whereby when the AND circuit 3920 gives an output signal on the output line 3922 upon receipt of all the signals indicating that the voltage [$N_3$] proportional to the transmission output shaft revolutions $N_3$ has a value higher than that corresponding to $N_3 = 1150$ rpm (30 Km/h in car speed equivalent), the slip ratio of the torque converter is less than 0.9 and the transmission is in the second gear position, this output signal is applied to the AND circuit 3950 as one of its inputs and, when this signal continues for more than 6 seconds, a signal is produced on the output line 3322 of the synchronous timer circuit 3320, so that as this signal is also applied to the AND circuit 3950 as one of its input signals and the AND circuit 3950 is actuated, it is considered that an uphill road is detected and an output signal is produced on a line 3202.

According to the climbing road condition logic circuit 3200 constructed as described above, even if the vehicle enters into a hilly country and it climbs the hill with the transmission still in the second gear, the detection of the hilly country can be accomplished whenever the slip ratio becomes less than 0.9 as the result of an increase in the load due to the rising gradient and this condition continuous for more than 6 seconds, for example. According to the system of the present invention, the logic operation is performed such that the detection of hilly country can be accomplished even though the vehicle is not in the third speed or top gear when it enters into a hilly country.

The output of the climbing road condition logic circuit 3200 described above is applied to the bistable memory circuit 3600 through the OR circuit 3400 and the line 3402, so that the memory circuit is changed into the one stable state to produce a signal on the line 1932. Then, owing to the road conditions and other factors relating to the vehicle and the like, as the accelerator pedal is released and the slip ratio becomes larger than 0.9 so that a signal is generated on the line 1422 and the signal of the AND circuit 3950 is extinguished, the bistable memory circuit 3600 continuous to produce and maintain the signal on the line 1932 through which the output signal of the hilly country detecting unit 1930 is taken out. Accordingly, while the gear can be changed from the first gear position to the second gear position and vice versa, the transmission is not permitted to change to the top gear position, thereby ensuring a sufficient climbing power and good gear changing characteristics and eliminating any useless gear changes.

Figure 17:
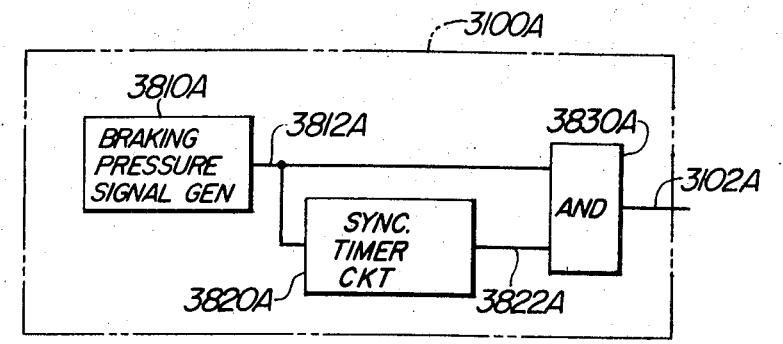
FIG. 17 is a block diagram of a first downhill road condition logic circuit incorporated in the hilly country detecting unit of FIG. 15.

The downhill road condition logic circuit 3100 shown in FIG. 15 will now be explained. The circuit 3100 is composed of two downhill road condition logic circuits 3100A and 3100B. The former downhill road condition logical circuit 3100A comprises, as shown in FIG. 17, a braking pressure signal generator 3810A, a synchronous timer circuit 3820A and an AND circuit 3830A. The AND circuit 3830A receives its input signals from a line 3812A of the braking pressure signal generator 3810A and from the same line 3812A through a line 3822A of the synchronous timer circuit 3820A, so that the AND circuit 3830A gives an output signal on a line 3102A when a signal is received through all of these lines.

Figure 18:
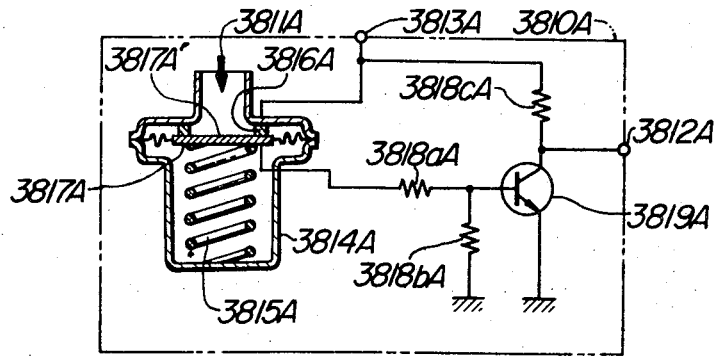
FIG. 18 is a schematic diagram of a braking pressure signal generator used with the first downhill road condition logic circuit shown in FIG. 17.

FIG. 18 illustrates an embodiment of the braking pressure signal generator 3810A. An arrow 3811A indicates the flow of a braking oil when the braking pressure is produced, and the braking pressure signal generator 3810A comprises a line 3812A on which the output signal of the circuit 3810A is taken, a source power supply terminal 3813A, a braking pressure detecting switch 3814A, a spring 3815A opposing the braking pressure, contact terminals 3816A and 3817A, resistors 3818$a$A, 3818$b$A and 3818$c$A, and a transistor 3819A.

The braking pressure detecting switch 3814A is connected with a brake pipe which is not shown, so that as the brake pedal is depressed, the braking oil is admitted as shown by the arrow 3811A. A system which illustrates a brake pedal and associated fluid line which may be used with braking pressure detecting switch 3814A is shown in Okamoto et al., U.S. Pat. No. 3,540,780, Nov. 17, 1970. When the oil pressure becomes higher than a predetermined constant pressure (15 Kg/cm$^2$), the spring 3815A is compressed thus bringing the contact terminal 3816A out of engagement with the contact 3817A mounted on a bellows 3817A'. The contact terminal 3816A is connected to the source power supply terminal 3813A and the contact terminal 3817A is connected to one end of the resistor 3818$a$A whose the other end is connected to one end of the resistor 3818$b$A and the base of the transistor 3819A, while the other end of the resistor 3818$b$A and the emitter of the transistor 3819A are grounded and the collector of this transistor is connected to one end of the resistor 3818$c$A and the output line 3812A for the output signal of the braking pressure detecting circuit 3810A with the other end of the resistor 3818$c$A being connected to the source power supply terminal 3813A. With the brake pedal being released, no braking pressure is applied at the arrow 3811A and the contacts 3816A and 3817A are engaged with each other. Thus, current flows through the base-emitter side of the transistor 3819A to the ground from the source power supply terminal 3813A via the resistor 3818$a$A and the transistor 3819A is thus rendered conductive, so that the collector of the transistor 3819A is grounded as a current flows therethrough from the source power supply terminal 3813A via the resistor 3818$c$A and thus no signal is produced on the output line 3812A.

On the other hand, when the brake pedal is depressed so that the braking pressure is applied at the arrow 3811A, the spring 3815A is compressed to disengage the contact terminals 3816A and 3817A. When this happens, no current flows through the base-emitter side of the transistor 3819A via the resistor 3818$a$A and the transistor 3819A is thus cut off, whereby a voltage is applied to the collector of the transistor 3819A from the source power supply terminal 3813A via the resistor 3818$c$A and thus an output signal is produced on the line 3812A. The resistor 3818$b$A is provided such that the leakage current applied to the base of the transistor 3819A is caused to flow through the resistor 3818bA to thereby stabilize the operation of the transistor 3819A.

Figure 19:
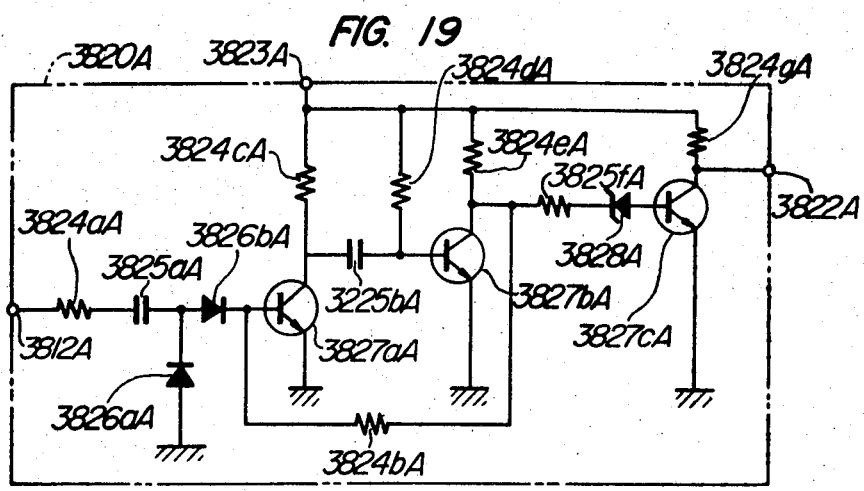
FIG. 19 is an electrical wiring diagram of a synchronous timer circuit used with the first downhill road condition logic circuit shown in FIG. 17.

Referring now to FIG. 19, there is illustrated an embodiment of the synchronous timer circuit 3820A. This synchronous timer circuit 3820A comprises the line 3812A for introducing the input signal to the circuit, a line 3822A on which the output signal of the circuit 3820A is taken out, a source power supply terminal 3823A, resistors 3824aA, 3824bA, 3824cA, 3824dA, 3824eA, 3824fA and 3824gA, capacitors 3825aA and 3825bA, diodes 3826aA and 3826bA, transistors 3827aA, 3827bA and 3827cA, and a reference diode 3828A. The resistor 3824aA has its one end connected to the input signal line 3812A and the other end connected to one end of the capacitor 3825aA whose the other end is connected to the cathode of the diode 3826aA and the anode of the diode 3826bA, while the anode of the diode 3826aA is grounded and the cathode of the diode 3826bA is connected to one end of the resistor 3824bA and the base of the transistor 3827aA. The emitter of the transistor 3827aA is grounded and its collector is connected to one end of the resistor 3824cA and one end of the capacitor 3825bA, while the other end of the resistor 3824cA is connected to the source power supply terminal 3823A and the other end of the capacitor 3825bA is connected to one end of the resistor 3824dA and the base of the transistor 3827bA with the other end of the resistor 3824dA being connected to the source power supply terminal 3823A. The emitter of the transistor 3827bA is grounded and its collector is connected to the other end of the resistor 3824bA, one end of the resistor 3824eA and one end of the resistor 3824fA, while the other end of the resistor 3824eA is connected to the source power supply terminal 3823A and the other end of the resistor 3824fA is connected to the cathode of the reference diode 3828A whose anode is connected to the base of the transistor 3827cA. The transistor 3827cA has its emitter connected to the ground and its collector connected to one end of the resistor 3824gA and a line 3822A on which the output signal is taken out and the other end of the resistor 3824gA is connected to the source power supply terminal 3823A.

When an input signal (voltage) is applied to the line 3812A, the voltage is applied to one end of the capacitor 3825aA through the resistor 3824aA and current flows to the other end of the capacitor 3825aA while the capacitor is being charged, so that this current flows through the diode 3826bA actuating the transistor 3827aA and a monostable multivibrator of the known type comprising the transistors 3827aA and 3827bA, resistors 3824bA, 3824cA, 3824dA and 3824eA, and the capacitor 3825bA. When this happens, the transistor 3827bA is cut off for a given time period (3.5 seconds according to the present invention) as determined by the capacitor 3825bA and the resistor 3824dA, so that a voltage is applied to the collector of the transistor 3827bA from the source power supply terminal 3823 through the resistor 3824eA and this voltage is also applied to the reference diode 3828A through the resistor 3824fA. Then, if the zener voltage of the reference diode 3828A is preselected to be 4 volts, there is a flow of current through the base-emitter side of the transistor 3827cA to the ground via the reference diode 3828A when the potential at the cathode of the reference diode 3828A becomes higher than 4 volts, whereupon the transistor 3827cA conducts causing a current to flow through the collector-emitter side of the transistor 3827cA to the ground from the source power supply terminal 3823A via the resistor 3824gA and thus no output signal is produced on the line 3822A. After the aforesaid given time, the transistor 3827bA is rendered conductive and there is a current flow from the source power supply terminal 3823A via the resistor 3824eA into the collector of the transistor 3827bA so as to connect it to the ground, whereby no current flows through the base-emitter side of the transistor 3827cA via the resistor 3824fA and the reference diode 3828A and the transistor 3827cA is cut off. Thus, a voltage is applied to the collector of the transistor 3827cA from the source power supply terminal 3823A via the resistor 3824gA and thus an output signal is produced on the line 3822A. The diode 3826aA serves to facilitate the discharging of the capacitor 3825aA.

When no input signal (voltage) is applied to the line 3812A, no signal is applied to the one end of the capacitor 3825aA through the resistor 3824aA and hence the conventional type monostable multivibrator comprising the transistors 3827aA, 3827bA etc.. is not actuated to maintain the identical conditions as the operations which take place following the previously mentioned given time. Thus, as described above, a voltage appears at the collector of the transistor 3827cA and thus an output signal (voltage) is produced on the line 3822A. In other words, when the synchronous timer circuit 3820A receives an input signal (voltage) at the line 3812A, the aforesaid monostable multivibrator is actuated to keep the output signal on the line 3822A off for the given time period. Accordingly, the operation of the downhill road condition logical circuit 3100 is such that when the brake pedal (not shown) is depressed and the braking pressure builds up higher than a preset value, the braking pressure signal generator 3810A generates an output signal on the line 3812A and this signal provides one of the inputs to the AND circuit 3830A of FIG. 17, while the signal on the line 3812A is introduced at the input of the synchronous timer circuit 3820A so that the output signal of this circuit 3820A is taken on the line 3822A at a specified time after the application of the signal to the timer circuit 3820A and this output signal provides another input to the AND circuit 3830A which in turn produces an output signal on the line 3102A in the presence of all of these input signals as previously explained. Thus, the logical operation is performed which gives an indication of a downhill road when this output signal is produced.

Figure 20:
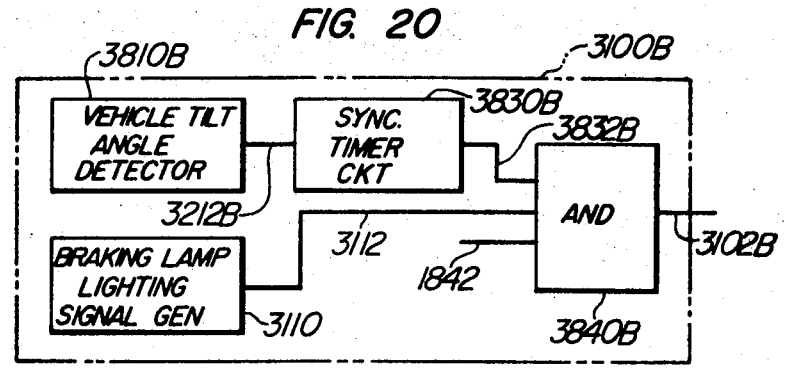
FIG. 20 is a block diagram of a second downhill road condition logic circuit incorporated in the hilly country detecting unit shown in FIG. 15.
Figure 21:
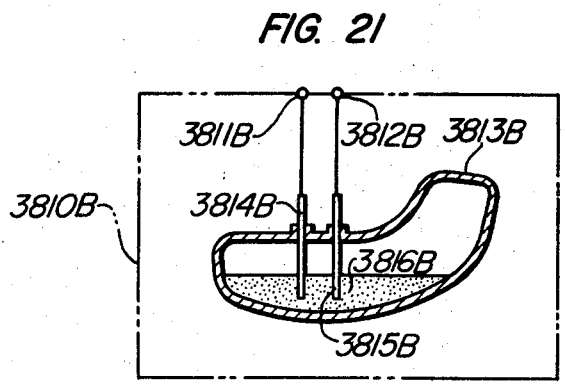
FIG. 21 is a schematic diagram showing an embodiment of a vehicle tilt angle detector used with the second downhill road condition logic circuit shown in FIG. 20.

In addition to the embodiment described above, there is another method of detecting a downhill road by means of the angle of inclination, which will now be explained. Referring to FIG. 20, the downhill road condition logic circuit 3100B comprises a vehicle tilt angle detector 3810B, the braking lamp lighting signal generator 3110 of the construction shown in FIG. 8, a synchronous timer circuit 3830B and an AND circuit 3840B. The AND circuit 3840B receives its input signals from an output line 3832B of the synchronous timer circuit 3830B which receives its input signal from the vehicle tilt angle detector 3810B, the output line 3112 of the braking lamp lighting signal generator 3110, and the output line 1842 of the top gear position circuit 1840, so that the AND circuit 3840B gives an output signal on a line 3102B when it receives the signals from all of these lines. An embodiment of the vehicle tilt angle detector 3810B is illustrated in FIG. 21, in which numerals 3811B and 3812B designate input and output lines of the detector 3810B, 3811B a grounded earthing line which is not shown, 3813B a casing providing a shielding protection for contact terminals 3814B and 3815B and mercury 3816B, with the mercury 3816B being intended to close and open the contact terminals 3814B and 3815B. The grounded line 3811B is connected to the contact terminal 3814B and the output line 3812B is connected to the contact terminals 3815B. Under the conditions (conditions on a level road) shown in FIG. 21, a circuit is established between the contact terminals 3814B and 3815B through the mercury 3816B and the output line 3812B is grounded. As the vehicle tilt angle detector 3810B tilts in excess of a preset value, the mercury 3816B moves from the left to the right in FIG. 21 so that a current flow between the contact terminals 3814B and 3815B is interrupted and the output 3812B is de-energized. The construction of the synchronous timer circuit 3830B is identical with that of the synchronous timer circuit 3320 shown in FIG. 12 and therefore no detailed description will be made here, but its operation is such that an output signal is produced on the line 3832B at a specified time after the application of an input signal to the line 3812B (with a delay of 1 second according to the present invention).

With the construction described above, the downhill road condition logic circuit 3100B operates such that when the tilt angle of the vehicle exceeds a preset valve, the vehicle tilt angle detector 3810B is actuated and a signal is produced on the line 3812B. This signal is then applied to the synchronous timer circuit 3830B so that when the signal on the line 3812B remains on more than a preset time, an output signal is produced on the output line 3832B of the synchronous timer circuit 3830B, while there is a signal on the output line 1842 of the top gear position circuit 1840 and an output signal is generated on the output line 3112 of the braking lamp lighting signal generator 3110 when it is actuated upon depressing the brake pedal which is not shown. Thus, the logical operation is performed in that in response to the presence of all of the three signals an output signal is generated on the line 3102B of the AND circuit 3840B and the generation of this signal gives an indication of a downhill road.

Figure 22:
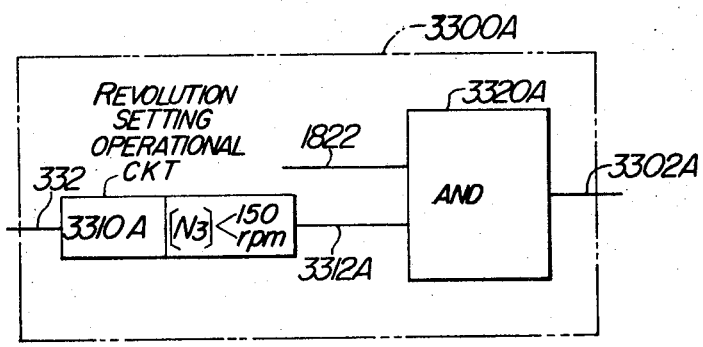
FIG. 22 is a block diagram of a first hilly country releasing condition logic circuit incorporated in the hilly country detecting unit shown in FIG. 15.

The hilly country releasing condition logic circuit 3300 comprises three hilly country releasing logic circuits 3300A, 3300B and 3300C. The hilly country releasing condition logic circuit 3300A is composed of a revolution setting operational circuit 3310A and an AND circuit 3320A as shown in FIG. 22. The revolution setting operating circuit 3310A is identical with the previously described revolution setting operational circuit 1340, 1350, 1360, 1370 and 1380 excepting that its input signal is applied through the output line 332 of the output shaft revolution operating 330. In other words, the revolution setting operational circuit 3310A generates an output signal on the line 3312A when the output shaft revolution $N_3$ drops lower than a preset car speed of 150 rpm (4 Km/h in car speed), for example. The AND circuit 3320A generates an output signal on a line 3302A when signals simultaneously appear on the line 1822 of the low gear position circuit 1820 and the line 3312A of the revolution setting operational circuit 3310A so that the logic operation is performed which gives an indication of the presence of the hilly country releasing conditions when all of these signals are generated, that is, when the car is brought to a standstill.

Figure 23:
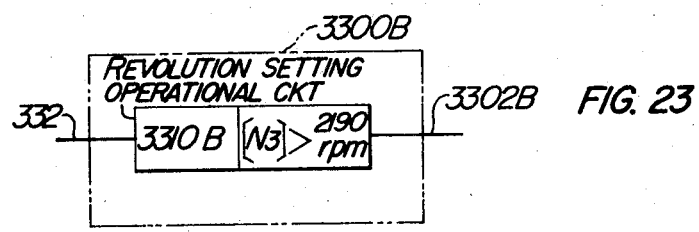
FIG. 23 is a block diagram of a second hilly country releasing condition logic circuit incorporated in the hilly country detecting unit shown in FIG. 15.

The hilly country releasing condition logic circuit 3300B is solely composed of a revolution setting operational circuit 3310B, as shown in FIG. 23, which is identical in construction with the revolution setting operational circuit 1340 etc., excepting that an output signal is produced on a line 3302B when the output shaft revolution $N_3$ becomes higher than 2190 rpm (60 Km/h in car speed), and thus the logic circuit 3300B performs a logic operation such that an indication of the hilly country releasing conditions is provided irrespective of the gear position whenever the signal appears on the line 3302B, that is, the car is running at a speed of 60 Km/h.

Figure 24:
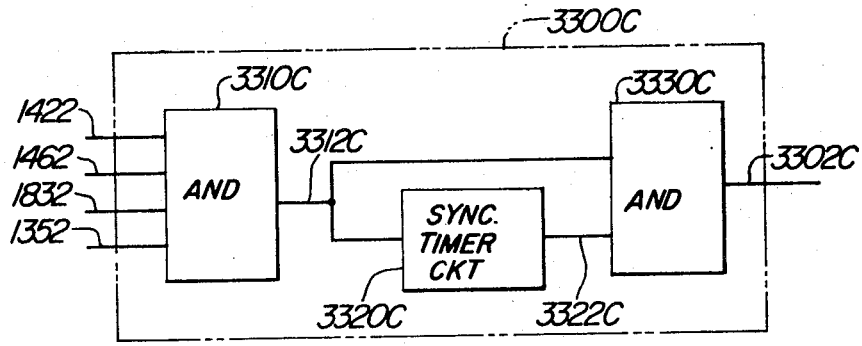
FIG. 24 is a block diagram of a third hilly country releasing condition logic circuit incorporated in the hilly country detecting unit shown in FIG. 15.

Next, the hilly country releasing condition logic circuit 3300C will be explained with reference to FIG. 24. This explanation will be made as an example of the hilly countryreleasing condition logic design. The logic design is such that the releasing of hilly country is effected when four signal elements from the output line 1422 of the slip ($[N_2/N_1]0.90$) operating circuit 1420, the output line 1462 of the slip ($[N_2/N_1]<1.05$) operating circuit 1460, the output line 1832 of the second gear position circuit 1830 and the output line 1382 of the revolution ($[N_2]>1660$ rpm) setting operational circuit 1380, respectively, are simultaneously introduced and this condition is maintained during a preset time. In other words, the information of hilly country is cleared when the slip ratio ($N_2/N_1$) is between 0.90 and 1.05 and the car speed comes within the range of speeds at which shifting from the second speed to the third speed can occur (according to the present invention, the experimental gear changing speeds) and at the same time the four signals representing the second gear position are maintained for a preset time (according to the present invention, this is selected to be 3 seconds experimentally), that is, when the slip ratio of the torque converter falls within the predetermined range close to 1.0, the information of hilly country is cleared even if the gear is in the second gear position. In addition to the range of limits of the torque converter slip ratio ($N_2/N_1$), the degree of accelerator pedal positions) may be employed as an additional condition. In fact, this ensures greater effectiveness and therefore an embodiment incorporating this additional condition will be explained later.

An AND circuit 3310C produces a signal on an output line 3312C if signals are present at its inputs from all of the output line 1422 of the slip ($[N_2/N_1]>0.90$) operating circuit 1420, the output line 1462 of the slip ($[N_2/N_1]<1.05$) operating circuit 1460, the output line 1382 of the second gear position circuit 1830 and the revolution ($[N_2]>1660$ rpm) setting operational circuit 1380. The output line 3312C provides one of the input lines of an AND circuit 3330C and the other input line is provided by an output line 3322C of a synchronous timer circuit 3320C which is actuated by the output signal from the AND circuit 3310C and produces a signal on the output line 3322C with a definite time delay (with a delay of 3 seconds according to the present invention). An output signal (voltage) is produced on the line 3302C of the AND circuit 3330C when signals are present on both of the line 3312C of the AND circuit 3312C and the output line 3322C of the synchronous timer circuit 3320C. While the synchronous timer circuit 3320C will not be explained in detail as its construction is identical with that of the synchronous timer circuit 3320 shown in FIG. 12, the synchronous timer circuit 3320C produces an output signal on the line 3322C upon continued application of an input signal on the line 3312C in excess of the preset time (3 seconds).

With the embodiment described above, the explanation has been made of a case wherein a signal representing the slip ratio higher than the predetermined lower limit (0.90) and a signal representing the slip ratio higher than predetermined upper limit (1.05) are applied to the first AND circuit 3310C in the third hilly country releasing condition logical circuit 3300C so as to give an indication that the slip ratio is within the predetermine range of values near unity, it should be noted that the slip ratio needs not always be within the predetermined range of value. Instead, the aforesaid predetermined lower limit may be altered, for example, depending upon variations in the accelerator pedal displacement (or the throttle valve openings), and for this reason a logical circuit responsive to the accelerator pedal displacement will now be explained.

Figure 25:
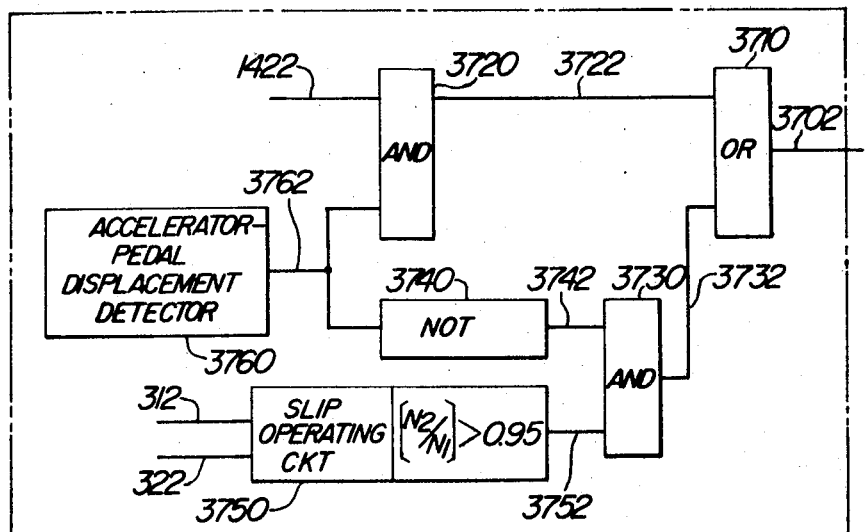
FIG. 25 is a block diagram of a slip ratio selecting logic circuit adapted to select either of the predetermined slip ratios in accordance with the degree of depression of the accelerator pedal.

The block diagram shown in FIG. 25 illustrates the construction of an accelerator pedal displacement responsive logic circuit 3700 which alters the predetermined range of values of the torque converter slip ratio $[N_2/N_1]$ that provides an input signal to the AND circuit 3310C, and this logic circuit is so constructed that, for example, the range of the slip ratios $[N_2/N_1]$ (according to this embodiment, only the predetermined lower limit 0.90 of the slip ratio $[N_2/N_1]$ is changed) is altered depending upon the degree of accelerator pedal displacement (or accelerator pedal positions). An example of the possible mechanisms for obtaining electrical signals indicative of the accelerator pedal displacement is illustrated in Wakamatsu et al., U.S. Pat. No. 3,662,625, May 16, 1972 or in Ito et al., referred to above. Thus, if the slip ratio $[N_2/N_1]$ is K, either one of the two preset slip ratios $K_1$ and $K_2$ is selected according to the preset accelerator pedal displacements.

In FIG. 25, numeral 3710 designates an OR circuit, 3720 an AND circuit, 3730 an AND circuit, 3740 a NOT circuit, 3750 a slip ($[N_2/N_1]>0.95$) operating circuit, 3760 an accelerator-pedal displacement detector. Numeral 3702 designates an output line of the accelerator-pedal displacement responsive logical circuit 3700 and this line 3702 replaces the input line 1422 of the AND circuit 3310C when the circuit of this embodiment is incorporated in the hilly country releasing condition logical circuit 3300C of FIG. 24. One of the input lines of the OR circuit 3710 is an output line 3722 of the AND circuit 3720 and the other input line is an output line 3732 of the AND circuit 3730. The output line 1422 of the slip ($[N_2/N_1]>0.90$) operating circuit 1420 provides one of the input lines of the AND circuit 3720, while the other input line of the AND circuit 3720 is an output line 3762 of the accelerator-pedal displacement detector 3760, which is also the input line of the NOT circuit 3740. An output line 3742 of the NOT circuit 3740 is one of the input lines of the AND circuit 3730 and the other input line of the AND circuit 3730, is an output line 3742 of the slip ($[N_2/N_1]>0.95$) operating circuit 3750, while the two input lines of the slip ($[N_2/N_1]>0.95$) operating circuit 3750 consist of the output line 312 of the torque converter pump shaft revolution $[N_1]$ operating circuit 310 and the output line 322 of the torque converter turbine shaft revolution $[N_2]$ operating circuit 320. The accelerator-pedal displacement detector 3760 of the present invention is designed to operate such that a signal appears on the output line 3762 of the accelerator-pedal displacement detector 3760 when the displacement of the accelerator pedal is less than one-half, while no signal is produced on the output line 3762 of the accelerator-pedal displacement detector 3760 when the movement of the accelerator pedal is more than one-half. The remaining slip ($[N_2/N_1]>0.95$) operating circuit 3750, AND circuits 3720 and 3730, OR circuit 3710 and NOT circuit 3740 are identical both in construction and function with the previously described similar circuits and therefore they will not be explained in detail.

When the movement of the accelerator pedal is less than one half, a signal is produced on the line 3762, and if the slip ratio $[N2/N1]$ becomes larger than 0.90, a signal is produced on the line 1422 (see FIG. 4). As a result AND circuit 3720 is activated for producing a signal on the line 3722 which in turn permits OR circuit 3710 to produce an output on line 3702.

When the movement of the accelerator pedal is larger than one half, no signal is produced on line 3762 however with no input NOT circuit 3740 produces an output on line 3742 to AND gate 3730. If the slip ratio $[N2/N1]$ becomes larger than 0.95 a signal is produced on the line 3752 of slip operating circuit 3750 resulting in an output signal from and gate 3730 over line 3732 which causes OR gate 3710 to produce an output on the line 3702.

Figure 26:
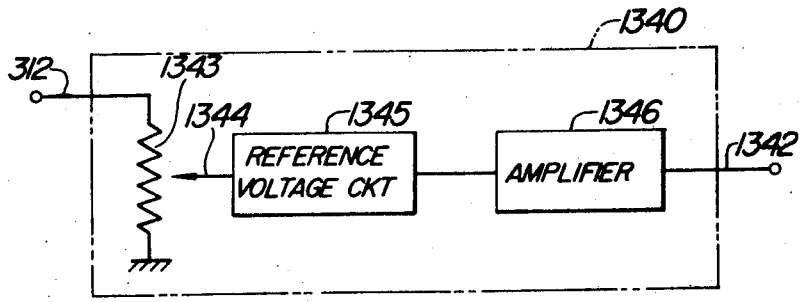
FIG. 26 is a block diagram showing the construction of a revolution setting operational circuit used with the control system shown in FIG. 4.

Referring back to FIG. 4, the component elements of the system will now be explained. The revolution setting operational circuit 1340 will be explained as an example of the revolution setting operational circuits 1340, 1350, 1360, 1370 and 1380. The operational circuit 1340 comprises, as shown in FIG. 26, a potentiometer 1343 with a center terminal 1344, a reference voltage circuit 1345 and an amplifier circuit 1346, whereby an output signal is produced on a line 1342 when the signal voltage $[N_1]$ applied to the line 312 exceeds a preset value.

Figure 27:
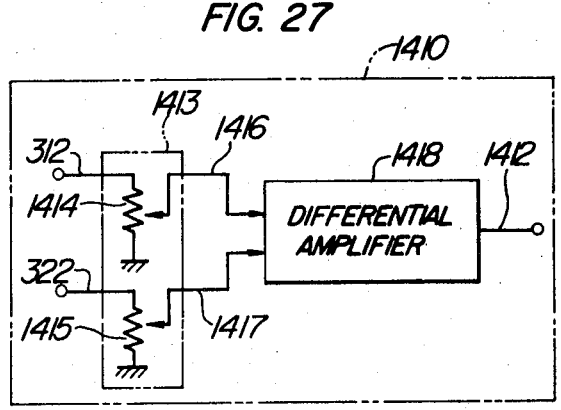
FIG. 27 is a block diagram showing the construction of a slip operating circuit used with the control system shown in FIG. 4.

By way of an example of the slip operating circuits 1410, 1420, 1430, 1440, 1450, 1460, 1470 and 1480 in FIG. 4, explanation will be made of the slip operating circuit 1410 which comprises, as shown in FIG. 27, potentiometers 1414 and 1415 and a differential amplifier 1418, whereby an output signal is produced when the slip ratio $[N_2/N_1]$ between the signals $[N_1]$ and $[N_2]$ corresponding respectively to the revolution $N_1$ of the torque converter pump shaft 11 and the revolution $N_2$ of the torque converter turbine shaft 14 and introduced through the lines 312 and 322, respectively, becomes larger than 0.85.

The AND circuits 1510, 1520, 1610, 1620 and 1910 may consist of a conventional AND circuit comprising, for example, a plurality of transistors connected in series to the input circuits such that an output is generated when all of the input signals are applied to the circuit, while the two OR circuits 1530 and 1630 may be a conventional OR circuit comprising a plurality of transistors connected in parallel to the input circuits so that an output signal is produced when any one of the input signals is applied to the circuit.

Figure 28:
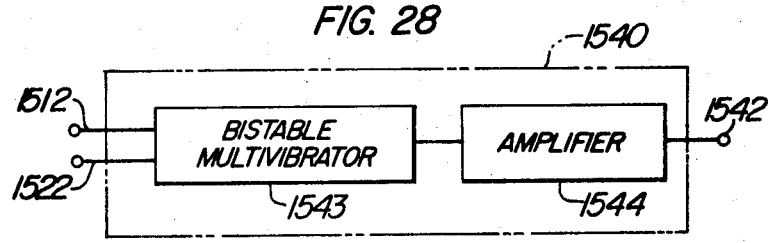
FIG. 28 is a block diagram showing the construction of a bistable memory circuit used with the control system shown in FIG. 4.

The two bistable memory circuits 1540 and 1640 of FIG. 4 will be explained referring by way of an example to the bistable memory circuit 1540 which comprises, as shown in FIG. 28, a bistable multivibrator 1543 and an amplifier circuit 1544, whereby the memory function is performed such that once an input signal is applied to a line 1512, the circuit is put into one of its two stable states so that an output signal is produced and maintained on a line 1542, while the circuit is changed Into the other stable state to keep the output signal on the line 1542 off when an input signal is applied to a line 1522.

Figure 29:
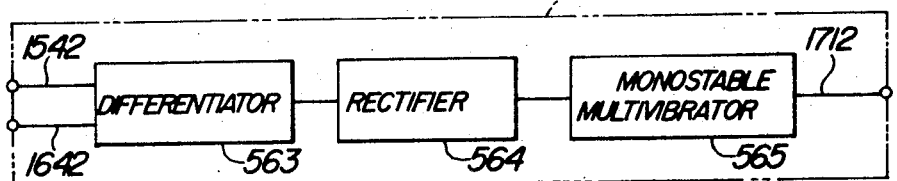
FIG. 29 is a block diagram of a synchronized timing hold circuit used with the control system shown in FIG. 4.

The synchronized timing hold circuit 1710 shown in FIG. 4 comprises, as shown in FIG. 29, a differentiator circuit 563 which differentiates the rectangular wave input voltages (solenoid voltages) introduced through lines 1542 and 1642, a rectifier circuit 564 for shaping the waveform to obtain a rectified voltage, and a monostable multivibrator 565 for producing an output voltage whose duration time is t seconds, whereby when an input signal is received through either of the line 1542 or the line 1642, an output signal is produced and maintained on a line 1712 for t seconds following the application of the input signal.

The NOT circuits 1720 and 1920 shown in FIG. 4 consist of a phase inverter circuit employing a single stage amplifier as is well known in the art. (see Wakamatsu et al. U.S. Pat. No. 3,641,844)

Figure 30:
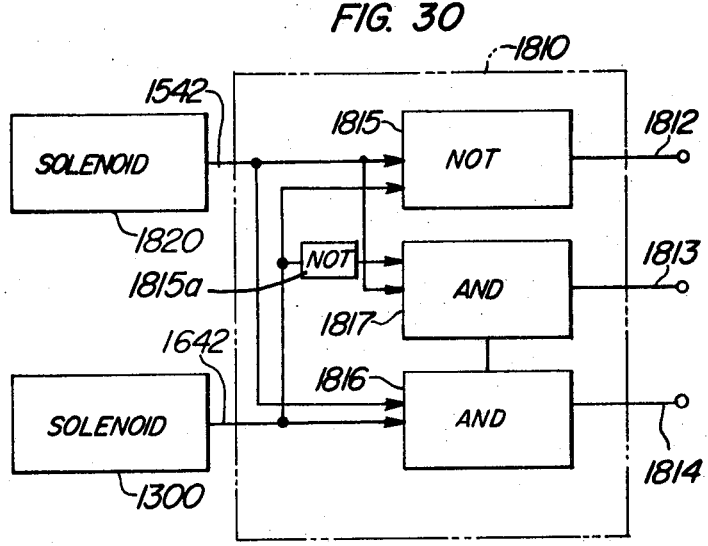
FIG. 30 is a block diagram of a shift position logic circuit used with the control system shown in FIG. 4.

The shift position logic circuit 1810 in FIG. 4 comprises, such as is shown in FIG. 30, NOT circuit 1815 and 1815a, and AND circuits 1817 and 1816, whereby an output signal is produced on a line 1812 only when signals are not introduced through lines 1542 and 1642, an output signal is produced on a line 1813 only when an input signal is applied to the line 1542 and no input signal is applied to the line 1642, and at the same time an output signal is produced on a line 1814 only when signals are applied to both of the lines 1542 and 1642.

Figure 31:
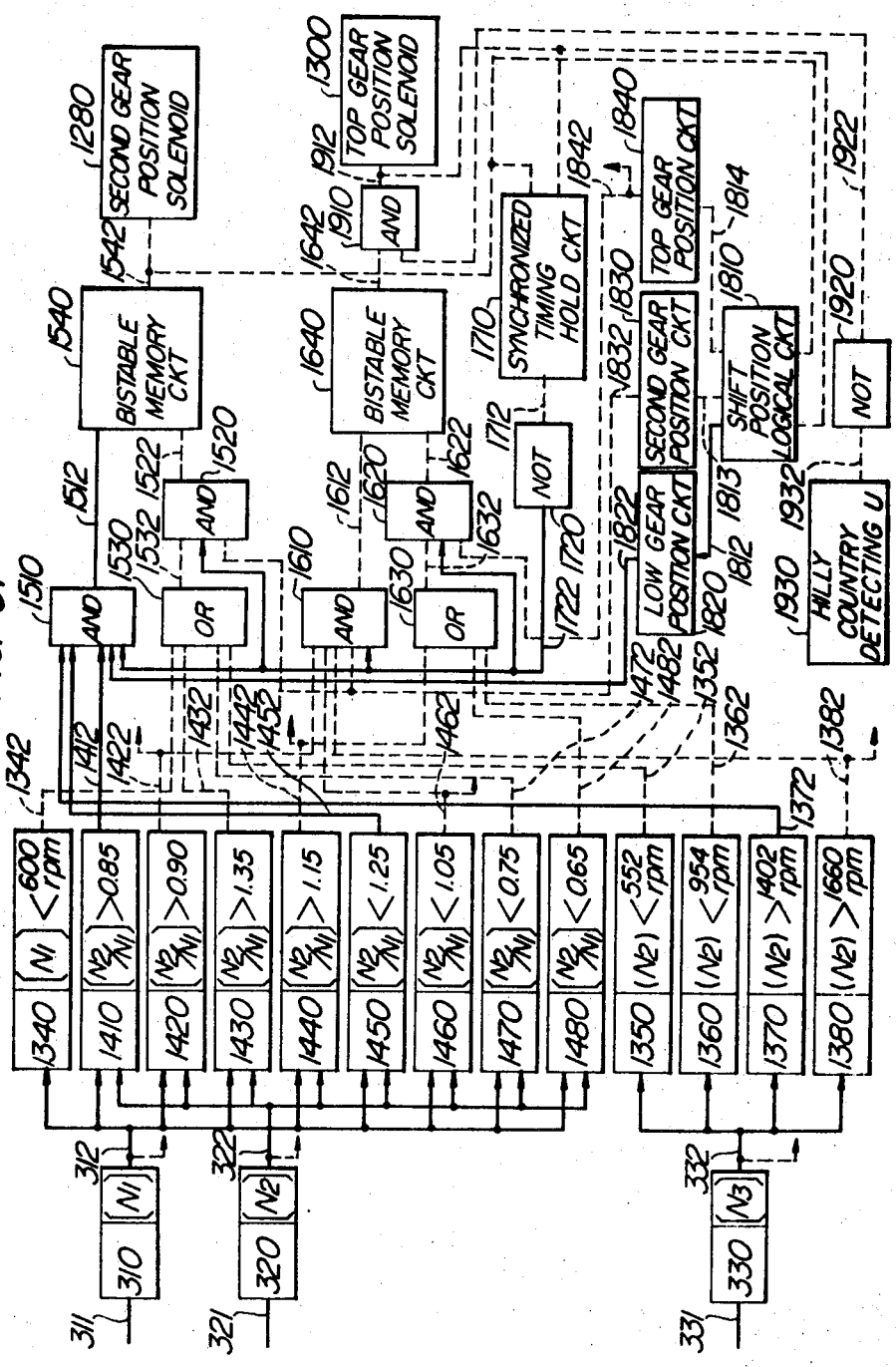
FIG. 31 is a block diagram for explaining the logic operation of the control system of FIG. 4 for shifting from low gear to the second gear.

The operation of the control system constructed as described above will now be explained. A shifting from the first gear position to the second gear position takes place when the vehicle moves into that shift region of FIG. 3A where the slip ratio $[N_2/N_1]$ of a torque converter transmission is larger than 0.85 but below 1.25 and the torque converter turbine shaft revolution $[N_2]$ is higher than 1402 rpm. That is, a memory function is performed in that, as shown in FIG. 31, when the AND circuit 1510A receives all the input signals thereto from the revolution $([N_2]>1402$ rpm) setting operational circuit 1370, the slip $([N_2/N_1]<1.25)$ operating circuit 1450, the slip $([N_2/N_1]>0.85)$ operating circuit 1410, the first gear position circuit 1820 and the NOT circuit 1720, the AND circuit 1510 produces an output signal which is in turn applied through the line 1512 to the bistable memory circuit 1540 so that the memory circuit 1540 produces and maintains its output signal. When this happens the solenoid 1280 is kept energized by means of the signal applied thereto from the bistable memory circuit 1540 through the line 1542, so that the torque converter transmission changes the gear ratio to the second gear position.

Figure 32:
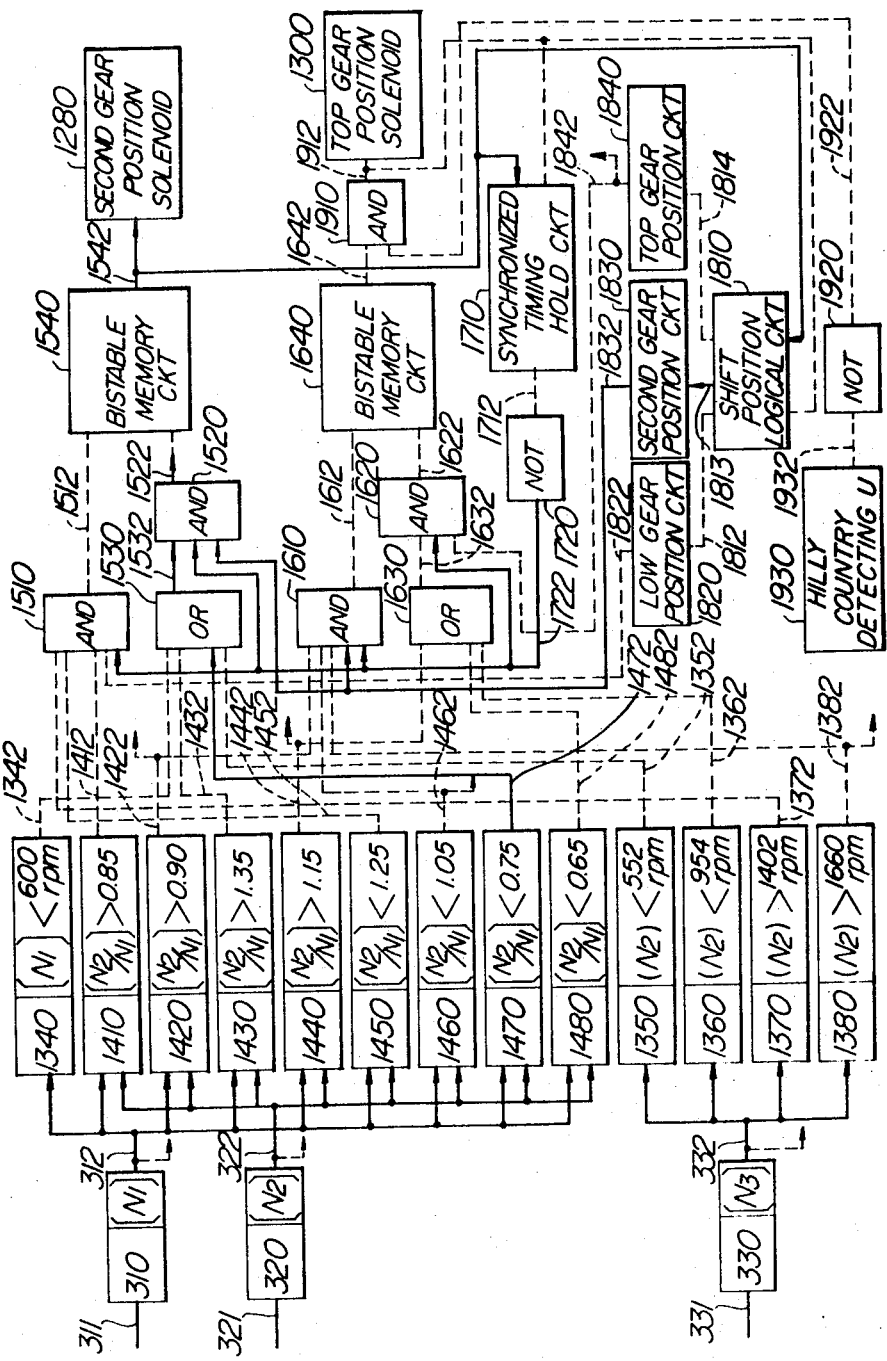
FIG. 32 is a block diagram for explaining the logic operation of the control system of FIG. 4 for shifting from the second gear to the low gear.

When changing the gear from the second gear position to the first gear position, as the slip ratio $[N_2/N_1]$ becomes lower than 0.75 in FIG. 3A, for example, the slip $([N_2/N_1]<0.75)$ operating circuit 1470 produces an output signal as shown in FIG. 32 and this signal is applied to the OR circuit 1530 through the line 1472 so that the OR circuit 1530 produces an output signal. This signal is then applied to the AND circuit 1520 through the line 1532 so that the AND circuit 1520 now receives all of its three input signals from the OR circuit 1530, NOT circuit 1720 and second gear position circuit 1830, respectively, and thus it produces an output signal. This signal is then applied to the bistable memory circuit 1540 to extinguish its output signal, whereupon the solenoid 1280 is deenergized thus changing the rear to the second gear position.

Figure 33:
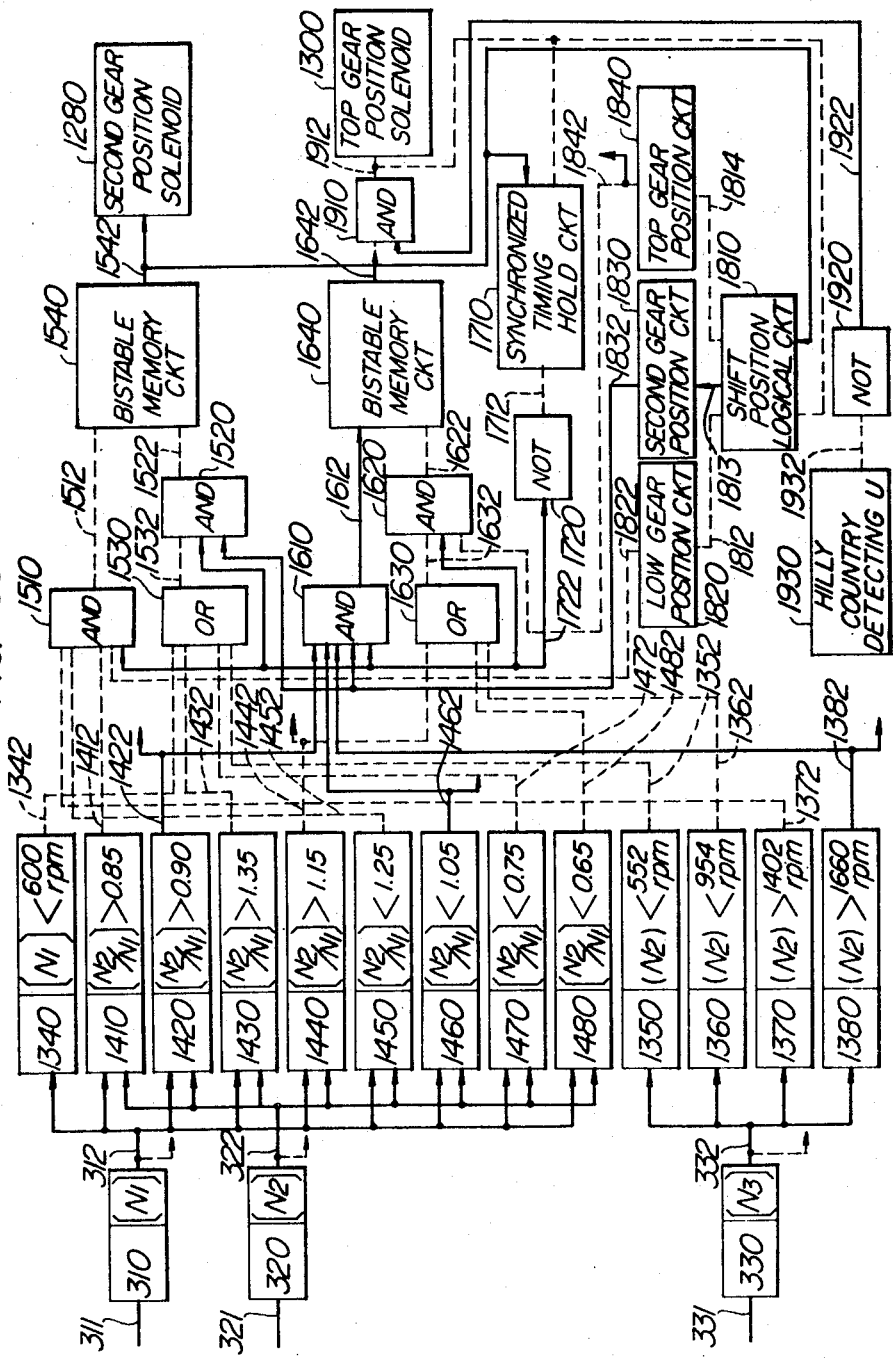
FIG. 33 is a block diagram for explaining the logic operation of the control system of FIG. 4 which takes place when the gear is changed from the second to the top gear.

The shift from the second gear position to the top gear position takes place as the condition of the torque converter transmission is moved into that region of FIG. 3B which is defined by solid lines and where $0.9 <$ slip ratio $[N_2/N_1]<1.05$ and $(N_2)>1660$ rpm. In other words, as shown in FIG. 33, each of the slip $([N_2/N_1]>0.90)$ operating circuit 1420, the slip $([N_2/N_1]>1.05)$ operating circuit 1460 and the revolution $([N_2>1660$rpm) setting operational circuit 1380 produces a signal and these signals are all applied to the AND circuit 1610, while on the other hand the torque converter transmission is under the steady state in the second gear position so that signals are also produced and applied to the AND circuit 1610 from the second gear position circuit 1830 and the NOT circuit 1720. When this happens, the AND circuit 1610 produces an output signal which in turn causes the bistable memory circuit 1640 to produce an output signal so that this signal energizes the solenoid 1300 thereby causing the torque converter transmission to change the gear to the top gear position.

Figure 34:
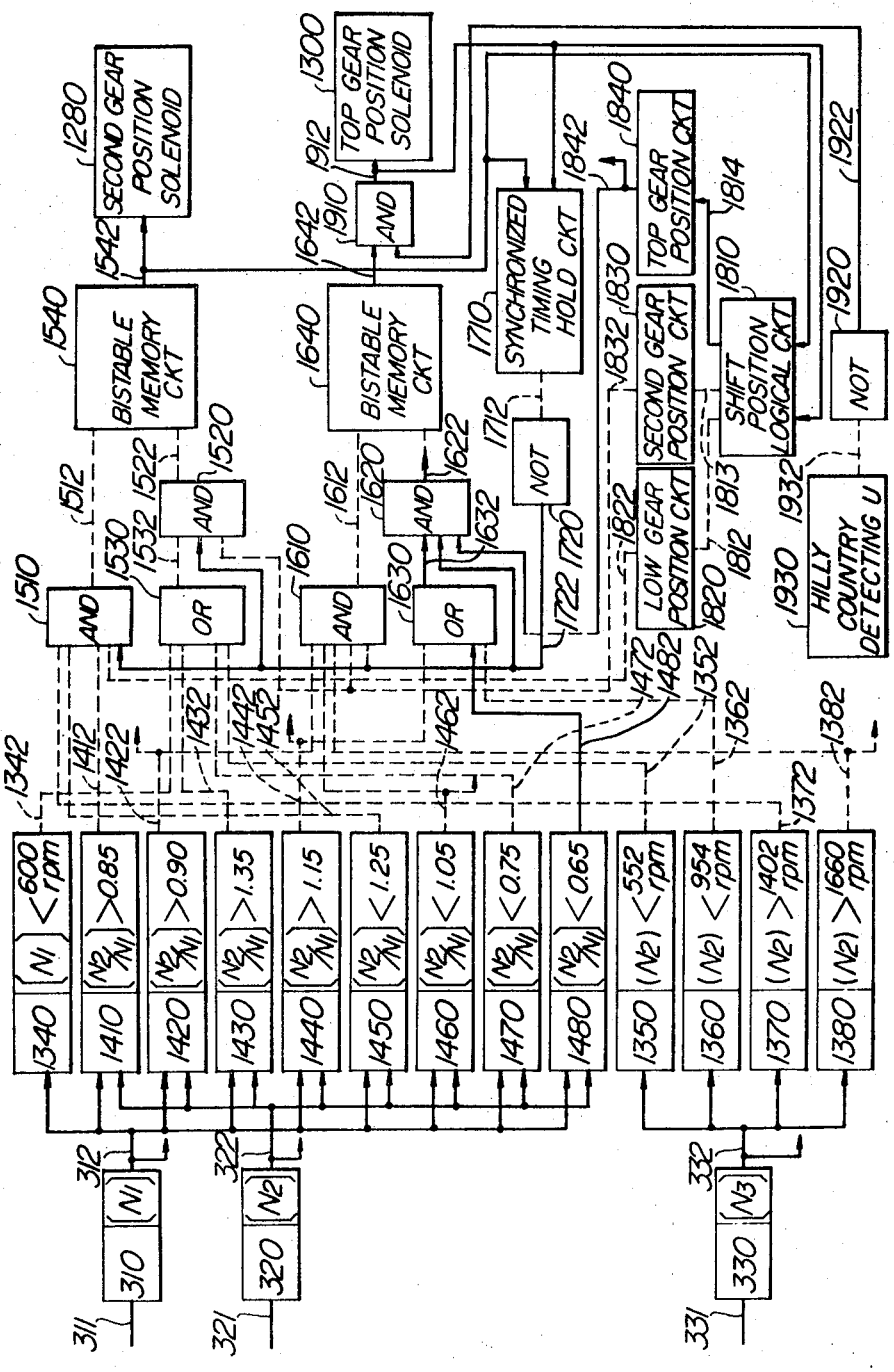
FIG. 34 is a block diagram for explaining the logic operation of the control system of FIG. 4 for effecting a shift from the top gear to the second gear.
Figure 35:
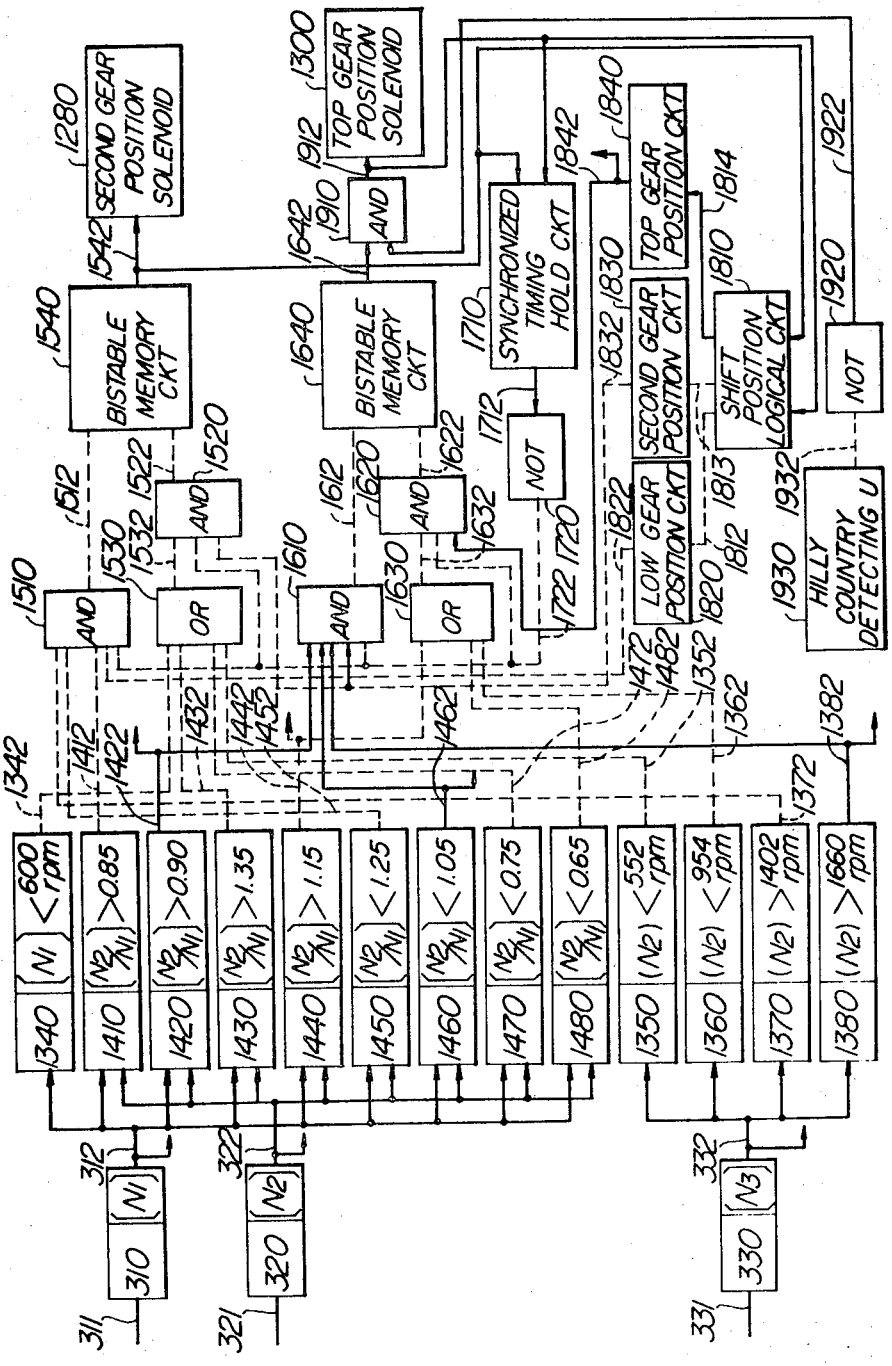
FIG. 35 is a block diagram for explaining the logic operation which takes place while the synchronized timing holding signal is maintained following the gear changing operation from the second to the top gear as shown in FIG. 33.

In the gear changing operation from the top gear to the second gear positions, as the slip ratio $(N_2/N_1)$ drops, for example, below 0.65 in FIG. 3B while the vehicle is running in the top gear position, as shown in FIG. 34, the slip $([N_2/N_1]<0.65)$ operating circuit 1480 produces an output signal this signal is then applied to the OR circuit 1630 through the line 1482 so that the OR circuit 1630 produces an output signal. This output signal is then applied through the line 1632 to the AND circuit 1620 which now receives all of its three input signals from the OR circuit 1630, NOT circuit 1720 and top gear position circuit 1840, respectively, whereupon the AND circuit 1620 produces an output signal which is applied to the bistable memory circuit 1640 to extinguish its output signal so that the solenoid 1300 is de-energized to effect the gear shift to the second gear position. Thus, the normal driving of the vehicle is ensured by the gear changing operations described above. In this connection, while in such gear changing operations the gear change will remain incomplete owing to a delay in the operation of the hydraulic actuation circuit or the like during a certain time immediately following the energization or de-energization of the solenoid 1280 or 1300, during this time in the shifting from the second gear position to the top gear position shown in FIG. 35, for example, the synchronized timing hold circuit 1710 gives an output signal on the line 1712 so as to extinguish the output signal of the NOT circuit 1720 off the line 1722. Thus, no signal is applied through the line 1722 to any of the AND circuits 1510, 1520, 1610 and 1620 with the result that any other shift signals will never be applied to either of the solenoids 1280 and 1300 during this particular time, thereby preventing the transmission from being damaged.

Figure 36:
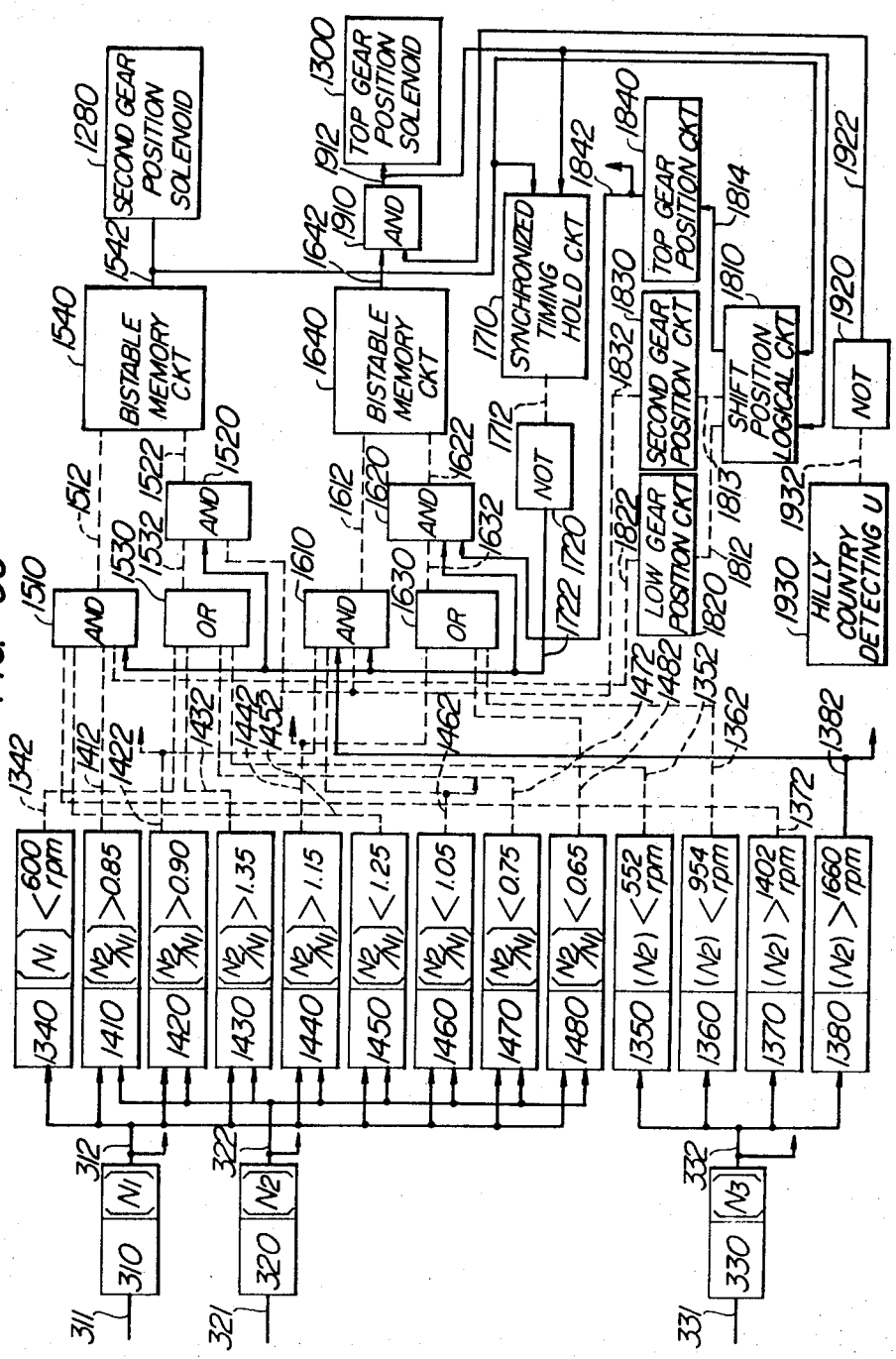
FIG. 36 is a block diagram for explaining the logic operation which takes place after the synchronized timing holding signal has been extinguished following the gear changing operation from the top to the second gear as shown in FIG. 34.

When this particular time elapses, as shown in FIG. 36, the synchronized timing hold circuit 1710 no longer produces its signal on the line 1712, so that the NOT circuit 1720 produces a signal on the line 1722 which is in turn applied to the AND circuits 1510, 1520, 1610 and 1620 thus placing the transmission in a condition to change to the next lower gear position.

As the vehicle first comes to an uphill road upon entering into a hilly country, the slip ratio is increased due to the steep grade of the ascent so that unless the slip ratio drops below 0.65 in FIG. 3B and at the same time the slip ratio becomes higher than a predetermined value within a given time (in three seconds) and the acceleration reaches a preset value, the climbing road condition logic circuit 3200 shown in FIG. 5 produces a signal on the line 3202. Then, the OR circuit 3400 produces a signal on the line 1402 and this signal places the bistable memory circuit 3600 in one stable state thereof so as to produce and maintain a signal on the line 1932. Consequently, while the gear changes between the first gear position and the second gear position are possible, the transmission is prevented from changing to the top gear position thereby achieving excellent shifting characteristics. On the other hand, when on a descent, if the vehicle acceleration detection signal generator 3120 produces a signal on the line 3122 because of being on the downhill road in spite of the fact that the transmission is in the top gear position, the signal is being applied from the top gear position circuit 1840 to the input line 1842 of the downhill road condition logical circuit 3100 and the slip ratio is larger than 1.15 so that the signal from the slip operating circuit 1440 is applied to the line 1442 and at the same time a signal is being produced on the line 3112 by the braking lamp lighting signal generator 3110 upon movement of the brake pedal, a signal is produced on the line 3132 through the time gate circuit 3130 excepting that the signal on the line 3122 is a noise signal which is extinguished in less than 0.5 seconds. As described above, the vehicle is on a descent when the signals are present on all of the lines 3112, 3132, 1842 and 1442 and thus the AND circuit 3140 produces a signal on the line 3142 so that this signal is applied through the OR circuit 3400 and the line 3402 to the bistable memory circuit 3600 to change it into the one stable state thereby producing a signal on the line 1932. If, after a moment, the brake pedal is released and the slip ratio exceeds 1.15, the signal on the line 1442 is turned off to extinguish the signal of the AND circuit 3140, the bistable memory circuit 3600 still continues to produce a signal on the output line 1932 of the hilly country detecting unit 1930 so as to prevent the gear from being changed into the top gear position and in this way a good engine braking effect is ensured. On the other hand, while it rarely happens that the slip ratio remains in the range between 0.9 and 1.0 for more than 3 seconds in the hilly country, the hilly country releasing condition logical circuit 3300 of FIG. 5 produces under this condition an output signal on the line 3302. Then, this output signal is applied through the OR circuit 3500 and the line 3502 to the bistable memory circuit 3600 so that this memory circuit is changed into the other stable state to keep the signal on the line 1932 off thus permitting ordinary gear changes.

When ascending or descending a hill in hilly country, if the hilly country detecting unit 1930 produces a signal on the line 1932, the NOT circuit 1920 extinguishes the signal on the line 1922. Then, the AND circuit 1910 no longer receives any signal at its one input line 1922 and hence no signal is produced on the line 1912 so that the solenoid 1300 is de-energized to change the gear to the second gear position. In this way, when ascending a hill the vehicle is provided with increased power to climb up the hill, whereas on a descent an improved engine braking effect is provided thereby ensuring a safe drive in the hilly country. Then, the synchronized timing hold circuit 1710 produces and maintains a signal on the line 1712 for a specified time immediately following the extinction of the signal on the line 1912, so that the NOT circuit 1720 is actuated to extinguish the signal on the line 1722.

The signal from the synchronized timing hold circuit 1710 extinguishes, as shown in FIG. 38, after the lapse of the aforesaid specified time and the NOT circuit 1720 produces its signal. On the other hand, the extinction of the signal on the line 1912 causes the shift position logic circuit 1810 to produce a signal on the line 1813 so that this signal is applied to the AND circuit 1520 through the second gear position circuit 1830 and the line 1832 thus placing the transmission in condition for changing the gear to the first gear position.

Although in the descriptions of the embodiment made hereinbefore, explanation has been made of cases wherein the AND circuits and the OR circuits constituting the control system are actuated by the application thereto of "1" signals (Voltage) to produce "1" signals, there is no question that other AND circuits and OR circuits may be used which are actuated to produce "0" signals when no input voltage is applied (when "0" signals are applied).

Furthermore, in the embodiments described above the electric control system for controlling the torque converter transmission has been explained as being an electric control system incorporating electronic operational circuitry which controls the transmission by means of the slip ratio of the torque converter, there is no doubt that the control system is in no way limited to this kind of control system and it may employ an electric control which effects controls for example, by means of those signals which correspond to the car speeds and throttle openings.

What we claim is:

1. An improved electrical automatic shift control system for an engine driven vehicle for controlling an automatic transmission system comprising: a torque converter including an input shaft, a pump connected thereto, and a torque converter output turbine driven thereby, a speed change gear unit connected to said turbine, friction engaging means for selectively accomplishing the gear changing engagements of said speed change gear unit, and a hydraulic actuation circuit for controlling said friction engaging means including; a shift region setting valve and at least one distributor valve for distributing an actuating oil to said friction engaging means, and an electrical control means for controlling the operation of said distributor valve of said hydraulic actuation circuit wherein the improved electrical control means comprises:

a hilly country detecting unit including:
  a climbing road condition responsive logic circuit,
  a downhill road condition responsive logic circuit,
  a hilly country releasing condition responsive logic circuit,
  each of said means selectively activated to produce output signals indicative of their respective conditions; and
a memory circuit, producing an output control signal for the control means, having at least two stable states and respondingly coupled to each of said three circuits so as to assume one stable state thereof and producing the output control signal upon application thereto of the respective signal from at least one of the following: the climbing road condition logic responsive circuit and the said downhill road condition responsive logic circuit and assuming the other stable state thereof and producing no output control signal upon application thereto of the signal from said hilly country releasing condition responsive logic circuit, thereby operating said distributor valve in accordance with said output control signal of said hilly country detecting unit.

2. The improved electrical automatic shift control system according to claim 1, wherein said downhill road condition responsive logic control circuit comprises:

means responsive to the running state of the vehicle including:
  vehicle acceleration signal generator means for producing a signal indicative of a selected acceleration rate,
  a gear position circuit responsive for producing signals indicative of each gear position, 3. The improved electrical automatic shift control system according to claim 1 wherein said hilly country releasing condition responsive logic circuit comprises:
  a revolution setting operational circuit means responsive for producing signals indicative of input and output revolution rates of said torque converter and transmission,
  a slip operating circuit responsive to selected outputs of the revolution setting means for producing slip rate ratio outputs indicative of differentials in torque converter input to output rates,
  a gear position responsive circuit for producing output signals indicative of respective gear position engagements,
  means responsive to said revolution setting operational circuit for producing signals respectively indicative of vehicle speed and acceleration,
  first AND circuit means for generating a conditioning output signal in response to the respective outputs representing a selected; slip rate ratio, gear position; and speed and acceleration rates;
  second AND circuit means having a first input responsively coupled to said first AND circuit and;
  a synchronous timer circuit responsively coupled to said first AND circuit output for inhibiting its output signal unless said first AND circuit output is present for at least a minimum selected duration thereby checking the integrity of said hilly country release output.

4. The improved electrical automatic shift control system according to claim 1 wherein slip operating circuit means, coupled to said torque converter produces outputs indicative of selected speed ratios of said torque converter and said climbing road condition response logic circuit produces a required output signal in accordance with a selected output of said slip operating circuit means below a predetermined value.

5. The improved electrical automatic shift control system according to claim 1 wherein said climbing road condition responsive logic circuit produces an appropriate output signal in accordance with; a high speed gear engagement position of the transmission; a speed ratio of a selected range, produced in response to input and output rates of the torque converter; a change in gear engagements to a next lower range; and substantial change in the speed ratio signal indicative of a nonengine braking condition; while vehicle acceleration responsive means produces an output below a selected maximum to indicate limited acceleration.

6. The improved electrical automatic shift control system according to claim 1 wherein said climbing road condition responsive logic circuit comprises:
  first AND circuit means for generating an output signal upon application thereto of a signal representing that the transmission is in a second gear position, a signal representing the vehicle speed is higher than a selected value, and a signal representing a speed ratio between the speeds of the input and output of said speed change gear, and the torque converter input is below a selected value;
  second AND circuit means for generating an output signal when the signal of said first AND circuit is applied to said second AND circuit directly; and
  a synchronous timer circuit for checking the duration of said first AND circuit means signal to produce an enabling input for said second AND circuit if said first signal is of a selected minimum duration.

7. The improved electrical automatic shift control system according to claim 1 wherein said downhill road condition responsive logic circuit comprises: a braking pressure signal generator responsive to a vehicle braking actuator, a synchronous timer circuit actuated in response to the signal from said braking pressure signal generator of a selected minimum duration, and AND circuit means for generating an output signal upon application thereto of the signals from said brake pressure signal generator and synchronous timer circuit.

8. The improved electrical automatic shift control system according to claim 1 wherein said downhill road condition responsive logic circuit comprises: circuit means responsive to provide indication of a minimum vehicle tilt angle, a synchronous timer circuit responsive thereto for timing the duration of said vehicle tilt, a braking lamp lighting signal generator circuit responsive to a vehicle braking actuator, a top gear position responsive circuit, and AND circuit means for generating an output signal upon application thereto of the signal from said four circuits.

9. The improved electrical automatic shift control system according to claim 1 wherein said hilly country releasing condition logic circuit comprises: a first gear position responsive circuit generating a signal relative thereto, a revolution setting operational circuit for generating an output signal when the speed of the output of the transmission becomes lower than a selected value representing that the vehicle is about to come to a standstill, and AND circuit means for generating an output signal upon application thereto of the signals from said two circuits.

10. The improved electrical automatic shift control system according to claim 1 wherein said hilly country releasing condition responsive logic circuit comprises: a revolution setting operational circuit for producing an output signal when the number of revolutions of the output of the transmission exceeds a selected value representing that the vehicle is running at a high speed.

11. The improved electrical automatic shift control system according to claim 1 wherein said hilly country releasing condition responsive logic circuit comprises: first AND circuit means for generating an output signal upon simultaneous application thereto of a signal representing a speed ratio between the speeds of the input and output of said torque converter which is higher than a selected lower limit and a signal representing said speed ratio which is below a selected upper limit, said two signals being indicative of said speed ratio which is within a selected range of values near 1.0, a signal representing that the transmission is in a second gear position, and a signal representing the vehicle maintains a speed higher than a selected speed; and second AND circuit means for generating an output signal upon application thereto of the signal directly introduced from said first AND circuit and a signal introduced through a synchronous timer circuit responsive for inhibiting said second AND signal unless said first AND signal is of a selected minimum duration.

12. The improved electrical automatic shift control system according to claim 1 wherein said hilly country releasing condition responsive logic circuit is for generating a signal when a speed ratio between the speeds of the input and output of said torque converter is within a selected range of values near 1.0, and means for varying said selected range of values corresponding with the degree of output of means responsive for producing a signal representative of accelerator pedal displacement.

* * * * *